US012737668B2

(12) United States Patent
Kaneko

(10) Patent No.: US 12,737,668 B2
(45) Date of Patent: Sep. 15, 2026

(54) MACHINE LEARNING APPARATUS, METHOD, AND NON-TRANSITORY COMPUTER READABLE MEDIUM STORING PROGRAM

(71) Applicant: NEC Corporation, Tokyo (JP)

(72) Inventor: Takuya Kaneko, Tokyo (JP)

(73) Assignee: NEC CORPORATION, Tokyo (JP)

( * ) Notice: Subject to any disclaimer, the term of this patent is extended or adjusted under 35 U.S.C. 154(b) by 1418 days.

(21) Appl. No.: 17/426,923

(22) PCT Filed: Jan. 17, 2020

(86) PCT No.: PCT/JP2020/001470
§ 371 (c)(1),
(2) Date: Jul. 29, 2021

(87) PCT Pub. No.: WO2020/158450
PCT Pub. Date: Aug. 6, 2020

(65) Prior Publication Data

US 2022/0108216 A1 Apr. 7, 2022

(30) Foreign Application Priority Data

Feb. 1, 2019 (JP) ................................ 2019-016650

(51) Int. Cl.
*G06N 20/00* (2019.01)

(52) U.S. Cl.
CPC .................................. *G06N 20/00* (2019.01)

(58) Field of Classification Search
CPC ...................................................... G06N 20/00
See application file for complete search history.

(56) References Cited

FOREIGN PATENT DOCUMENTS

| | | |
|---|---|---|
| JP | 2005-181928 A | 7/2005 |
| JP | 2008-217242 A | 9/2008 |

OTHER PUBLICATIONS

Frenay, Benoît, and Michel Verleysen. "Classification in the presence of label noise: a survey." IEEE transactions on neural networks and learning systems 25.5 (2013): 845-869. (Year: 2013).*

(Continued)

*Primary Examiner* — Miranda M Huang

(57) ABSTRACT

A machine learning apparatus (1) includes: a storage unit (11) configured to store a training data set; a group generation unit (12) configured to generate, from the training data set, a plurality of learning groups; a learning unit (13) configured to learn a predetermined data determination model for each of the plurality of learning groups and store a plurality of learned models that correspond to the respective learning groups in the storage unit (11); a determination unit (14) configured to input, to each of the plurality of learned models, determination target data that is not included in the corresponding learning group, and acquire first determination results; and a specifying unit (15) configured to specify a first inappropriate data group in which the label is possibly inappropriate from the training data set based on the first determination results and a correct answer label in the determination target data.

7 Claims, 13 Drawing Sheets

(56) References Cited

OTHER PUBLICATIONS

Venkataraman, Sundara, et al. "Distinguishing mislabeled data from correctly labeled data in classifier design." 16th IEEE International Conference on Tools with Artificial Intelligence. IEEE, 2004. (Year: 2004).*

Brodley, Carla E., and Mark A. Friedl. "Identifying mislabeled training data." Journal of artificial intelligence research 11 (1999): 131-167. (Year: 1999).*

Kotsiantis, Sotiris, Dimitris Kanellopoulos, and Panayiotis Pintelas. "Handling imbalanced datasets: A review." GESTS international transactions on computer science and engineering 30.1 (2006): 25-36. (Year: 2006).*

International Search Report for PCT Application No. PCT/JP2020/001470, mailed on Feb. 18, 2020.

Takamatsu, Shingo et al., "Reducing Wrong Labels in Distant Supervision for Relation Extraction", Proceedings of the 50th Annual Meeting of the Association for Computational Linguistics, Jul. 8, 2012, pp. 721-729, Korea.

* cited by examiner

MACHINE LEARNING APPARATUS, METHOD, AND NON-TRANSITORY COMPUTER READABLE MEDIUM STORING PROGRAM

This application is a National Stage Entry of PCT/JP2020/001470 filed on Jan. 17, 2020, which claims priority from Japanese Patent Application 2019-016650 filed on Feb. 1, 2019, the contents of all of which are incorporated herein by reference, in their entirety.

TECHNICAL FIELD

The present disclosure relates to a machine learning apparatus, a method, and a program, and in particular, to a machine learning apparatus, a method, and a program in supervised learning.

BACKGROUND ART

In recent years, machine learning techniques including supervised learning have been widely used. In general, in order to create a data determination model with high accuracy by supervised learning, it is required to perform learning using appropriate training data. However, when inappropriate training data is provided such as in a case in which an incorrect label is attached to the training data, it is difficult to create a data determination model with high accuracy.

In order to solve the above problem, for example, Patent Literature 1 discloses a technique for removing, from training data, data to which an inappropriate label is attached. In Patent Literature 1, a data determination model is created based on all the pieces of training data, and then a determination using the created data determination model is made using training data as test data. After training data in which the result of the determination is different from a label attached in advance is removed, a data determination model is created again. In another example, Patent Literature 2 discloses a technique for removing training data that contributes less to the accuracy of the data determination model than other training data.

CITATION LIST

Patent Literature

[Patent Literature 1] Japanese Unexamined Patent Application Publication No. 2005-181928

[Patent Literature 2] Japanese Unexamined Patent Application Publication No. 2008-217242

SUMMARY OF INVENTION

Technical Problem

In the techniques disclosed in Patent Literature 1 and 2, however, there is a problem that the efficiency of specifying data to which an inappropriate label is attached from among a large amount of training data used for learning is not sufficiently high. The reason therefore is that, since for example, the test data to be determined by the data determination model is the training data used to learn this data determination model, it is expected that the probability that the result of the determination is different from a label is not very high.

The present disclosure has been made in order to solve the above problem and aims to provide a machine learning apparatus, a method, and a program for efficiently specifying data to which an inappropriate label is attached from training data.

Solution to Problem

A machine learning apparatus according to a first aspect of the present disclosure includes:

- a storage unit configured to store a training data set, which is a plurality of pieces of training data, each of the pieces of training data being a pair of data and a label;
- a group generation unit configured to generate, from the training data set, a plurality of learning groups having data at least respective parts of which are different from each other;
- a learning unit configured to learn a predetermined data determination model for each of the plurality of learning groups and store a plurality of learned models that correspond to the respective learning groups in the storage unit;
- a determination unit configured to input, to each of the plurality of learned models, determination target data that is not included in the corresponding learning group, and acquire first determination results whose number corresponds to that of the learned models; and
- a specifying unit configured to specify a first inappropriate data group in which the label is possibly inappropriate from the training data set based on the first determination results and a correct answer label in the determination target data.

In a machine learning method according to a second aspect of the present disclosure,

- a computer generates a plurality of learning groups having data at least respective parts of which are different from each other from a training data set, which is a plurality of pieces of training data, each of the pieces of training data being a pair of data and a label,
- the computer learns a predetermined data determination model for each of the plurality of learning groups, thereby generating a plurality of learned models that correspond to the respective learning groups,
- the computer inputs, to each of the plurality of learned models, determination target data that is not included in the corresponding learning group, thereby acquiring first determination results whose number corresponds to that of the learned models, and
- the computer specifies a first inappropriate data group in which the label is possibly inappropriate from the training data set based on the first determination results and a correct answer label in the determination target data.

A machine learning program according to a third aspect of the present disclosure causes a computer to execute the following processing of:

- generating a plurality of learning groups having data at least respective parts of which are different from each other from a training data set, which is a plurality of pieces of training data, each of the pieces of training data being a pair of data and a label;
- learning a predetermined data determination model for each of the plurality of learning groups, thereby generating a plurality of learned models that correspond to the respective learning groups;
- inputting, to each of the plurality of learned models, determination target data that is not included in the corresponding learning group, and acquiring first determination results whose number corresponds to that of the learned models; and specifying a first inappropriate data group in which the label is possibly inappropriate from the training data set based on the first determination results and a correct answer label in the determination target data.

Advantageous Effects of Invention

According to the present disclosure, it is possible to provide a machine learning apparatus, a method, and a program for efficiently specifying data to which an inappropriate label is attached from training data.

DESCRIPTION OF EMBODIMENTS

Hereinafter, with reference to the drawings, example embodiments of the present disclosure will be described in detail. Throughout the drawings, the same or corresponding components are denoted by the same reference symbols and the overlapping descriptions will be omitted as appropriate for the sake of clarity of the description.

First Example Embodiment

Figure 1:
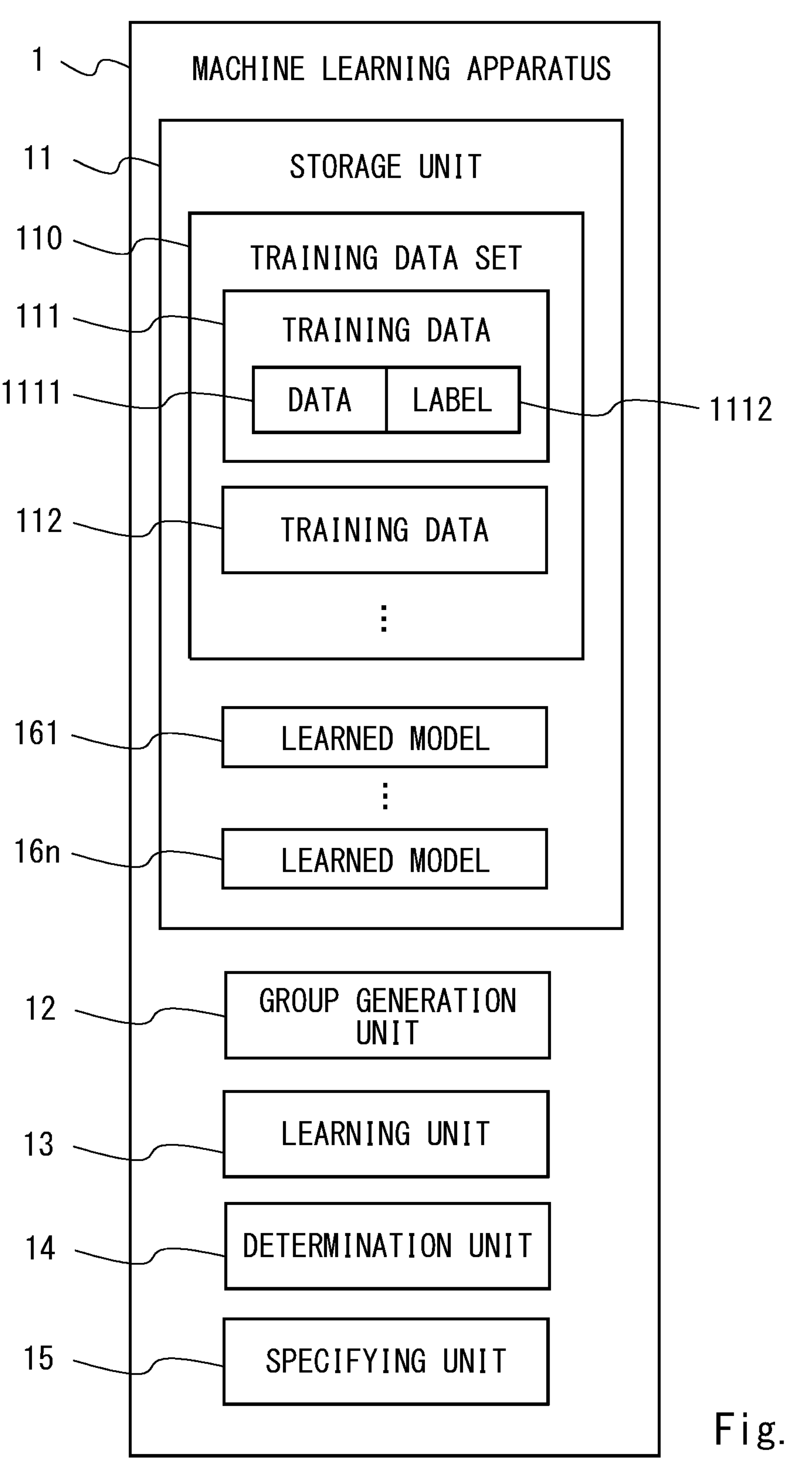
FIG. 1 is a block diagram showing the whole configuration of a machine learning apparatus according to a first example embodiment.

FIG. 1 is a block diagram showing the whole configuration of a machine learning apparatus 1 according to a first example embodiment. The machine learning apparatus 1 is an information processing apparatus for executing supervised learning and performing machine learning of parameters of a predetermined model. The machine learning apparatus 1 includes a storage unit 11, a group generation unit 12, a learning unit 13, a determination unit 14, and a specifying unit 15.

The storage unit 11 is a storage apparatus that stores at least a training data set 110. The training data set 110 is a set of a plurality of pieces of training data 111, 112, . . . . The training data 111 is composed of a pair of data 1111 and a label 1112 determined (evaluated) in advance regarding the property of the data 1111. That is, the data 1111 is associated with the label 1112. The configurations of the training data 112 and the other subsequent data are similar to that of the training data 111.

The storage unit 11 further stores learned models 161-16*n* (n is a natural number equal to or greater than two). Each of the learned models 161-16*n* is a model whose parameters are learned by different training data for one data determination model. Therefore, at least specific parameters of the learned models 161-16*n* are different from one another. The data determination model here is to perform an operation on input data using parameters (weighting coefficients etc.) and determine (and output) a label that corresponds to the input data. The data determination model, which is achieved by a program, a library function or the like, may be, for example, a neural network or the like.

The group generation unit 12 generates a plurality of learning groups from the training data set 110. The plurality of learning groups have data at least respective parts of which are different from each other. That is, each learning group is a subset including at least a part of the training data set 110. Then the learning groups have different sets. However, some of the subsets may be common between learning groups. Further, one learning group may be included in another learning group. However, the plurality of learning groups do not have the same set.

The learning unit 13 learns a predetermined data determination model for each of the plurality of learning groups and stores a plurality of learned models 161-16*n* that correspond to the respective learning groups in the storage unit 11. That is, the learning unit 13 performs learning of parameters of the data determination model using a specific learning group among the plurality of learning groups as training data. Then the learning unit 13 independently performs learning for each of the plurality of learning groups. Therefore, the learning unit 13 generates learned models whose number corresponds to that of the learning groups (in this example, n). In other words, each of the learned models 161-16*n* is a model learned by training data of different data ranges for a common data determination model.

Note that the algorithm used for the learning performed by the learning unit 13 is not particularly limited as long as it belongs to supervised learning. Some algorithms may require, besides training data and labels, parameters or reference models, which form the basis of the data determination model. The parameters and the reference models may be set manually or may be automatically set using various tuning methods.

The determination unit 14 inputs, to each of the plurality of learned models 161-16*n*, determination target data that is not included in the corresponding learning group, thereby acquiring first determination results whose number corresponds to that of the learned models. It is assumed, for example, that the learned model 161 has been learned by a data group that belongs to a learning group A. In this case, the determination unit 14 sets data that does not belong to the learning group A as determination target data for the learned model 161. Therefore, the determination target data is data that is not included in the training data set 110 or data that does not belong to the learning group A although it is included in the training data set 110. Therefore, when the determination target data is not included in the training data set 110, the determination target data input to each of the learned models may be common data. Alternatively, the determination target data may be data different for each learned model or may be common among some learned models.

The specifying unit 15 specifies a first inappropriate data group whose label may be inappropriate from the training data set 110 based on the first determination result and a correct answer label in the determination target data. It is assumed that the correct answer label in the determination target data is a label determined in advance by a human or a reliable determination algorithm and is appropriate as determination (evaluation) of the property of the determination target data. It is further assumed that the machine learning apparatus 1 acquires the determination target data and the correct answer label from a storage apparatus (not shown) inside the machine learning apparatus 1 or from an external device. Further, the specifying unit 15 may store the specified first inappropriate data group in the storage unit 11 or output the specified first inappropriate data group to the outside of the machine learning apparatus 1.

Figure 2:
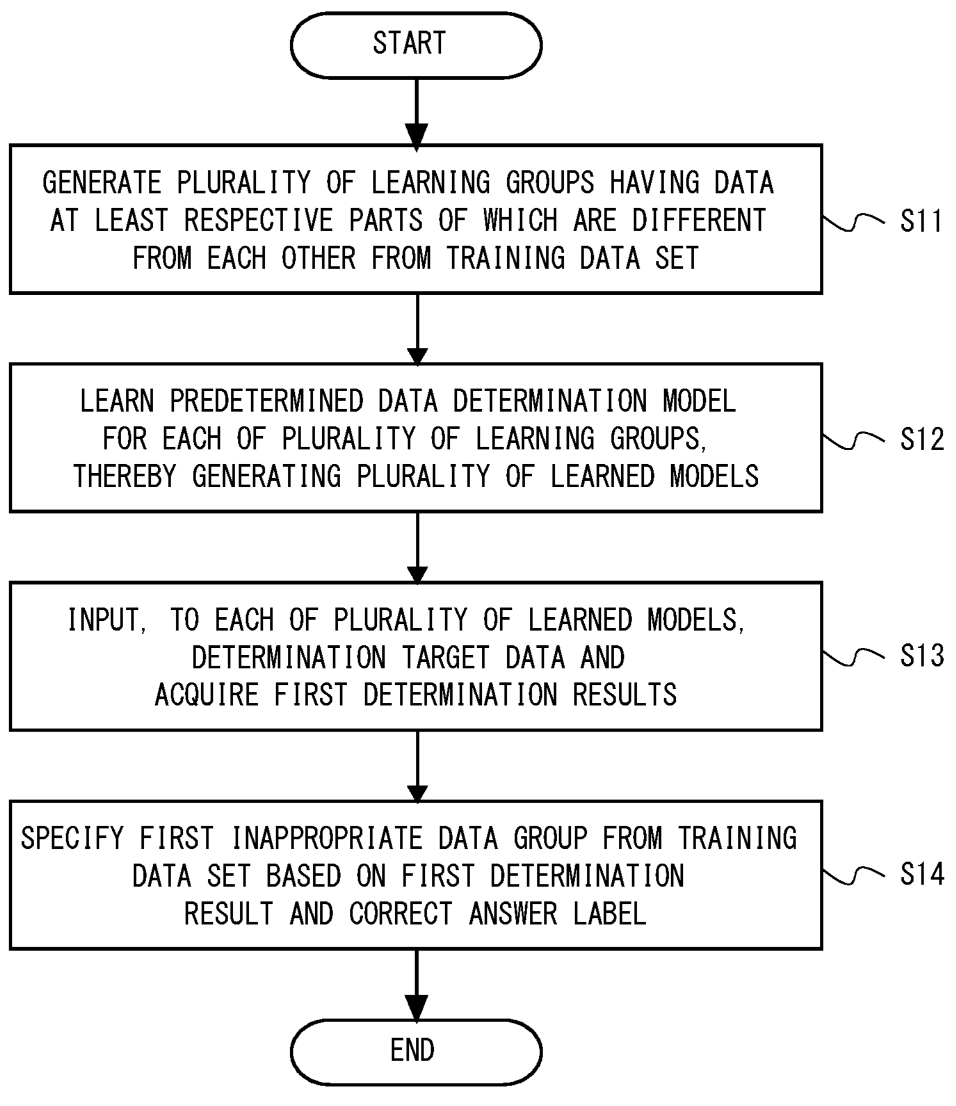
FIG. 2 is a flowchart showing a flow of processing of a machine learning method according to the first example embodiment.

FIG. 2 is a flowchart showing a flow of processing of a machine learning method according to the first example embodiment. First, the group generation unit 12 generates a plurality of learning groups having data at least respective parts of which are different from each other from the training data set 110 (S11). Next, the learning unit 13 learns the predetermined data determination model for each of the plurality of learning groups, thereby generating a plurality of learned models that correspond to the respective learning groups (S12). At this time, the learning unit 13 may store the generated learned models 161-16*n* in the storage unit 11.

Then the determination unit 14 inputs, to each of the plurality of learned models, determination target data that is not included in the corresponding learning group and acquires the first determination results whose number coincides with the number of learned models (S13). After that, the specifying unit 15 specifies a first inappropriate data group whose label may be inappropriate from the training data set 110 based on the first determination result and the correct answer label in the determination target data (S14).

As described above, in the first example embodiment, a plurality of learning groups with different data ranges are generated from the training data set 110. Then learning is performed on one data determination model for each learning group, whereby learned models which are based on different learning results (parameters) are generated. In addition, data that has not been used for learning is input to each of the learned models as determination target data, thereby acquiring the first determination result.

It can be said that, if a correct, that is, an appropriate label is attached to each training data in the learning group, the learned model learned using this learning group is highly likely to output an "appropriate" determination result (label) to the determination target data. On the other hand, if training data to which an inaccurate or inappropriate label is attached is included in the learning group, it can be said that the learned model learned using this learning group is highly likely to output an "inappropriate" determination result to the determination target data. In view of this, in the first example embodiment, when, for example, the first determination result does not coincide with the correct answer label, it is assumed that training data to which an inappropriate label is attached is highly likely to be included in the learning group used for the learning of the learned model. In this case, the specifying unit 15 specifies at least some of data groups in the learning group as the first inappropriate data group. Therefore, according to the first example embodiment, there is no need to manually re-examine the labels of all the data in the training data set 110, and it is possible to efficiently specify data to which an inappropriate label is attached from the training data.

The machine learning apparatus 1 includes a processor, a memory, and a storage apparatus, which are not shown. Further, the storage apparatus stores a computer program in which processing of a machine learning method according to this example embodiment is implemented. This processor loads the computer program into the memory from the storage apparatus and thereby executes this computer program. Accordingly, the processor achieves functions of the group generation unit 12, the learning unit 13, the determination unit 14, and the specifying unit 15.

Alternatively, each of the group generation unit 12, the learning unit 13, the determination unit 14, and the specifying unit 15 may be implemented by dedicated hardware. Further, some or all of the elements of each device may be implemented by general-purpose or dedicated circuitry, processor, or a combination of them. They may be configured using a single chip, or a plurality of chips connected through a bus. Some or all of the elements of each device may be implemented by a combination of the above-described circuitry, etc. and a program. Further, a Central Processing Unit (CPU), a Graphics Processing Unit (GPU), a field-programmable gate array (FPGA) and so on may be used as a processor.

In a case where some or all of the elements of the machine learning apparatus 1 are implemented by a plurality of information processing apparatuses, circuitries, and so on, the plurality of information processing apparatuses, circuitries, and so on may be centralized or dispersed. For example, the information processing apparatuses, circuitries, and so on may be implemented as a form in which components are connected through a communication network, such as a client-server system or a cloud computing system. Further, the functions of the machine learning apparatus 1 may be provided in Software as a Service (SaaS) format.

Second Example Embodiment

In the following, a problem solved in this example embodiment will be described in detail. First, various proposals for creating a data determination model with high accuracy of the determination using supervised learning have been made. As one of the fields, there is an attempt to create a data determination model with higher accuracy than that in a case in which the whole training data is used by reducing prepared training data under certain conditions. As one example, since labels are typically attached to the training data manually, it is possible that labels different from ones that should be attached may be actually attached to the training data. Therefore, by learning parameters of a data determination model after removing training data to which an incorrect label is attached (hereinafter this data will be referred to as inappropriate training data), a data determination model with higher accuracy can be generated.

However, according to the above technique, information that forms a basis for selecting the training data to be reduced is the training data itself used for learning. Therefore, it is unlikely that "training data that seems to be labeled correctly in view of the tendency of other pieces of training data but is actually labeled incorrectly" will be detected. For example, while training data used for learning is determined using a created data determination model in Patent Literature 1, this data determination model has been created based on the training data in the first place. Therefore, it is considered that, in Patent Literature 1, the probability that a label is different from a result of the determination is not so high. Further, the technique disclosed in Patent Literature 1 is not efficient since inappropriate training data is specified from among a large amount of training data using only one data determination model learned using the large amount of training data.

Further, when there is a possibility that a label attached to the training data used at the time of learning is incorrect for the completed (learned) data determination model, it is normally required to check all the pieces of training data and all the labels. When the data determination model is well trained for training data, even when training data is determined using this data determination model, a result of the determination in accordance with the label originally attached is output. In this case, the data determination model cannot be used to check validity of the label. Therefore, it is required to check each of the pieces of the training data and each label, which requires a large cost.

Further, in contrast to "batch learning" in which a data determination model is created based on all the pieces of training data that have been prepared, there is a technique called "online learning" in which a data determination model is updated while learning training data one by one.

One of the features of online learning is to update a data determination model in such a way that training data to be newly learned is correctly determined. In online learning, the newer the training data is, the stronger the impact on the model. Therefore, online learning is efficient in a case in which old training data tends to be obsolete due to environmental changes or the like. On the other hand, online learning is not efficient in a case in which the influence of environmental changes is small or a case in which it is desired to reflect the results of learning the old training data in the data determination model.

The second example embodiment is one specific example of the aforementioned first example embodiment, and one that solves at least some of the aforementioned problems will be described below.

Figure 3:
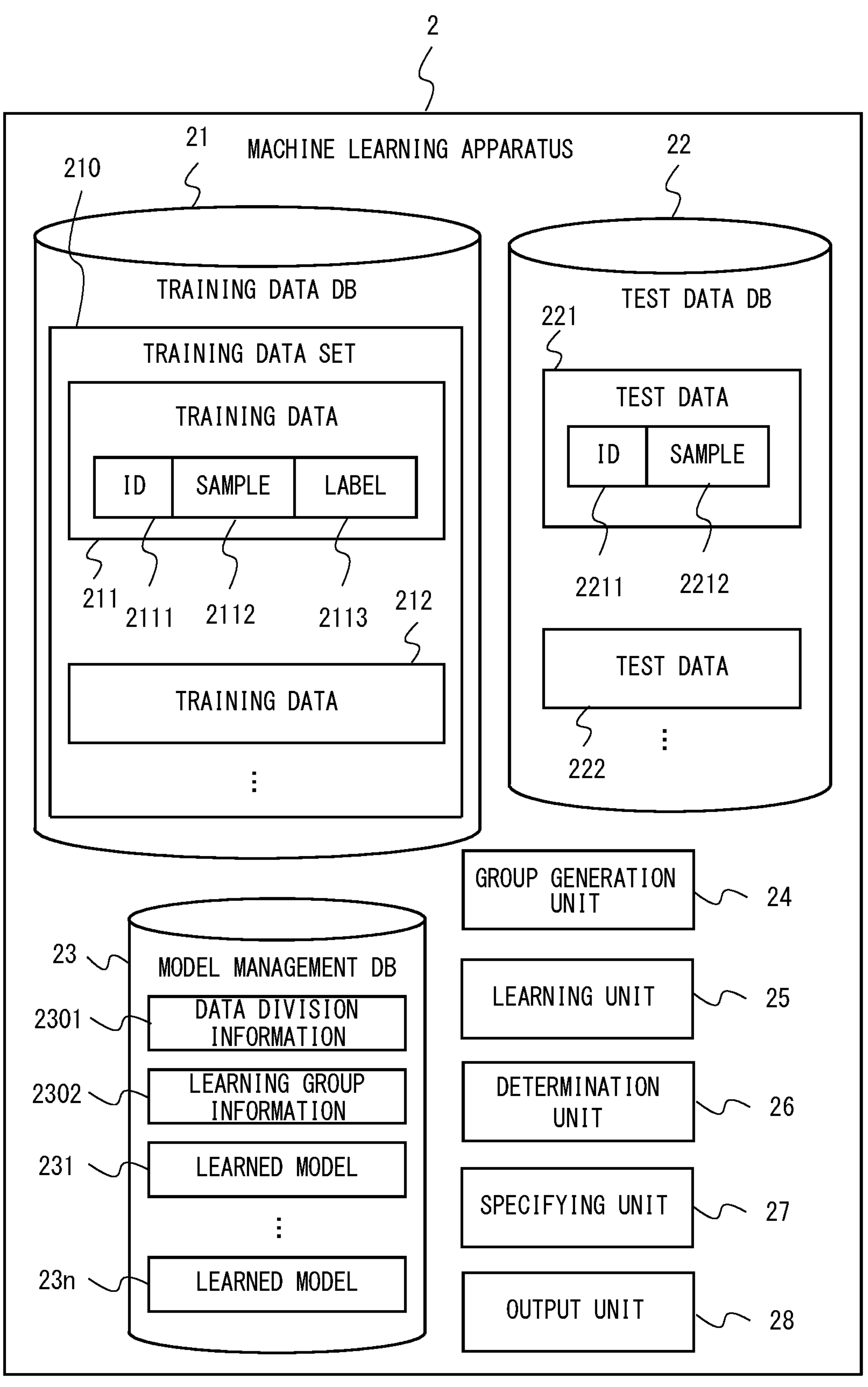
FIG. 3 is a block diagram showing a configuration of a machine learning apparatus according to a second example embodiment.

FIG. 3 is a block diagram showing a configuration of the machine learning apparatus 2 according to the second example embodiment. The machine learning apparatus 2 is one specific example of the machine learning apparatus 1 described above. The machine learning apparatus 2 includes a training data DB (DataBase) 21, a test data DB 22, a model management DB 23, a group generation unit 24, a learning unit 25, a determination unit 26, a specifying unit 27, and an output unit 28.

The training data DB 21 is a database that stores and manages a training data set 210. The training data set 210 is one specific example of the aforementioned training data set 110. The training data set 210 includes training data 211, 212, . . . . The training data 211, which is one specific example of the aforementioned training data 111, is composed of a set of an ID 2111, a sample 2112, and a label 2113 associated with one another. The ID 2111 is information for identifying the sample 2112. The sample 2112 is one specific example of the aforementioned data 1111. The sample 2112, which is data to be learned of a predetermined data determination model, may be, for example, an any type of file or a set of feature amounts extracted from this file. The label 2113 is information determined in advance regarding the property of the sample 2112. The label 2113 may be, for example, information indicating whether the sample 2112 is normal or abnormal or information indicating the degree indicated by a plurality of levels. The configurations of the training data 212 and the subsequent data are similar to that of the training data 211.

The test data DB 22 is a database that stores and manages test data 221, 222, . . . , which is one specific example of the determination target data in the learned model. The test data 221 is a pair of an ID 2211 and a sample 2212, which are associated with each other. The ID 2211 is information for identifying the sample 2212. The sample 2212 is information that is similar to the aforementioned sample 2112 but the content of the sample 2212 is different from that of the sample 2112. It is assumed that the sample 2212 is, for example, operation data acquired during an operation using a learned model. The configurations of the test data 222 and the subsequent data are similar to that of the test data 221.

The model management DB 23 is a database that stores and manages information regarding the data determination model. The model management DB 23 stores data division information 2301, learning group information 2302, and learned models 231-23*n*. The data division information 2301 is definition information of a plurality of subsets when the training data set 210 is divided. The learning group information 2302 is definition information of a plurality of learning groups that have been generated. The learned models 231-23*n* are specific examples of the aforementioned learned models 161-16*n*.

Note that the training data DB 21, the test data DB 22, and the model management DB 23 are implemented by a storage apparatus (not shown). Alternatively, one or all of the training data DB 21, the test data DB 22, and the model management DB 23 may be implemented by a storage apparatus provided outside the machine learning apparatus 2. Alternatively, one or all of the training data DB 21, the test data DB 22, and the model management DB 23 may show a state in which the externally acquired information is temporarily stored in an internal memory or the like.

The group generation unit 24 is one specific example of the aforementioned group generation unit 12. In particular, the group generation unit 24 according to the second example embodiment divides the training data set 210 into a plurality of subsets and generates the plurality of learning groups in such a way that each of the plurality of subsets belongs to at least one group. It is assumed here that the training data set 210 is divided into a predetermined number of subsets (in this example, n) in such a way that data do not overlap each other. Accordingly, the training data group (learning group) to be learned is a combination of subsets as appropriate. Therefore, a specific sample belongs to a plurality of learning groups and is used for learning of a plurality of different learned models. Therefore, if a label attached to the specific sample is inappropriate, it is possible that the result of the determination may be different from a label in a plurality of learned models, which causes the accuracy of detecting the inappropriate data to be improved. Further, by dividing the training data set 210 into a plurality of subsets in such a way that the data do not overlap each other, the difference between learned models whose results of the determination with respect to the same determination target data are different from each other, that is, the difference between the learning groups can be easily specified, whereby the inappropriate data can be efficiently specified.

Further, the group generation unit 24 may divide the training data set 210 into the plurality of subsets in such a way that the number of pieces of included data becomes even. Accordingly, the units of the subsets that are the difference between learning groups become uniform. Therefore, if a subset of inappropriate data group can be specified, a time to specify the actual inappropriate data among them can be smoothed.

Further, the group generation unit 24 preferably generates a plurality of learning groups in such a way that the number of subsets in each learning group differ from each other within a predetermined number (in this example, n). When, for example, the predetermined number n is 10, 10 subsets and 10 learning group are generated. In this case, the number of subsets in each learning group varies by one from 1 to 10. Accordingly, the time for specifying the inappropriate data can be further smoothed.

For example, the group generation unit 24 may set subsets in learning groups that are adjacent to each other in an ascending order of the number of subsets in each learning group as follows. First, it is assumed that N is a natural number equal to or larger than two but equal to or smaller than the number of subsets in each learning group. In this case, the group generation unit 24 selects N−1 subsets from among a predetermined number of subsets that have been divided, thereby generating an (N−1)-th learning group. The group generation unit 24 then generates an N-th learning group including all the subsets in the (N−1)-th learning group and one of subsets among the plurality of subsets that does not belong to the (N−1)-th learning group. Accordingly, each learning group is generated in such a way that the subsets are accumulated when the learning groups are arranged in an ascending order of the number of subsets in a learning group. Therefore, the subsets between learning groups that are adjacent to each other in terms of the number of subsets in each learning group are uniquely determined, whereby the efficiency of specifying the inappropriate data is further improved.

The learning unit 25 is one specific example of the aforementioned learning unit 13. It is assumed here that a plurality of learning groups according to the second example embodiment includes an entire training data group including all the data of the training data set 210. Then the learning unit 25 stores the learned models generated by learning the predetermined data determination model using the entire training data group as training data in the model management DB 23 as operation models.

The determination unit 26 is one specific example of the aforementioned determination unit 14. It is assumed that the determination unit 26 according to the second example embodiment reads out one or more pieces of the test data 221 and the like from the test data DB 22, and sets the data that has been read out as determination target data. Further, the determination unit 26 reads out the learned models 231-23*n* from the model management DB 23 and inputs the determination target data to each of the learned models 231 and the like. Then the determination unit 26 acquires the first determination result from each of the learned models 231 and the like.

Further, the determination unit 26 inputs the operation data externally acquired to the operation model as determination target data. The machine learning apparatus 2 adds, for example, the ID 2211 to the operation data externally acquired, which is the sample 2212, and stores the resulting data in the test data DB 22 as the test data 221. Then the determination unit 26 reads out the sample 2212 from the test data DB 22 and inputs it into the operation model, thereby acquiring the first determination result. If, for example, there is any doubt about the result of the determination of the actual data acquired during the operation in the operation stage, the training data set is examined. Then the quality of the training data set can be improved based on the specified inappropriate data group and the accuracy of the data determination model can be improved as well.

The specifying unit 27 is one specific example of the aforementioned specifying unit 15. The specifying unit 27 according to the second example embodiment compares each of the first determination results acquired from each learned model 231 and the like with the correct answer label. Then the specifying unit 27 specifies first learning group set among the plurality of learning groups that correspond to a learned model in which the result of the comparison shows a coincidence and second learning group set among the plurality of learning groups that correspond to a learned model in which the result of the comparison does not show a coincidence. After that, the specifying unit 27 specifies the first inappropriate data group by the difference between the first learning group set and the second learning group set. Accordingly, instead of reviewing all the data in the training data set 210, the range can be narrowed down to the difference in the training data between the learning groups and then it is checked whether the data is inappropriate or not, whereby it is possible to efficiently specify the inappropriate data.

Further, the determination unit 26 may input the first inappropriate data group to at least one learned model that corresponds to the first learning group set, thereby acquiring the second determination result. In this case, the specifying unit 27 specifies one or more pieces of data among the first inappropriate data group in which the second determination result does not coincide with the label as the second inappropriate data group. Then the learning unit 25 learns a predetermined data determination model using a set obtained by excluding the second inappropriate data group from the training data set 210 as training data and stores a new learned model in the model management DB 23. Accordingly, it is possible to improve the accuracy of the operation model.

As described above, when the number of pieces of data in a plurality of subsets is even, the specifying unit 27 may specify one of the plurality of subsets as the first inappropriate data group based on the first determination result. Accordingly, it is possible to efficiently narrow down the first inappropriate data group.

Further, the specifying unit 27 may specify the difference between first learning group and second learning group as a first inappropriate data group, the first learning group including the largest number of subsets among the first learning group set and the second learning group including the smallest number of subsets among the second learning group set. Accordingly, it is possible to narrow down the first inappropriate data group more strictly and accurately.

The output unit 28 outputs the output data, which includes the first and second determination results acquired by the determination unit 26 and at least a part of the first and second inappropriate data groups specified by the specifying unit 27 to the outside of the machine learning apparatus 2. For example, the output unit 28 causes a display device included in the machine learning apparatus 2 or connected to the machine learning apparatus 2 to display the output data. Alternatively, the output unit 28 may transmit the output data to a predetermined destination via a network. Alternatively, the output unit 28 may store the first output data in a storage apparatus in the machine learning apparatus 2.

Figure 4:
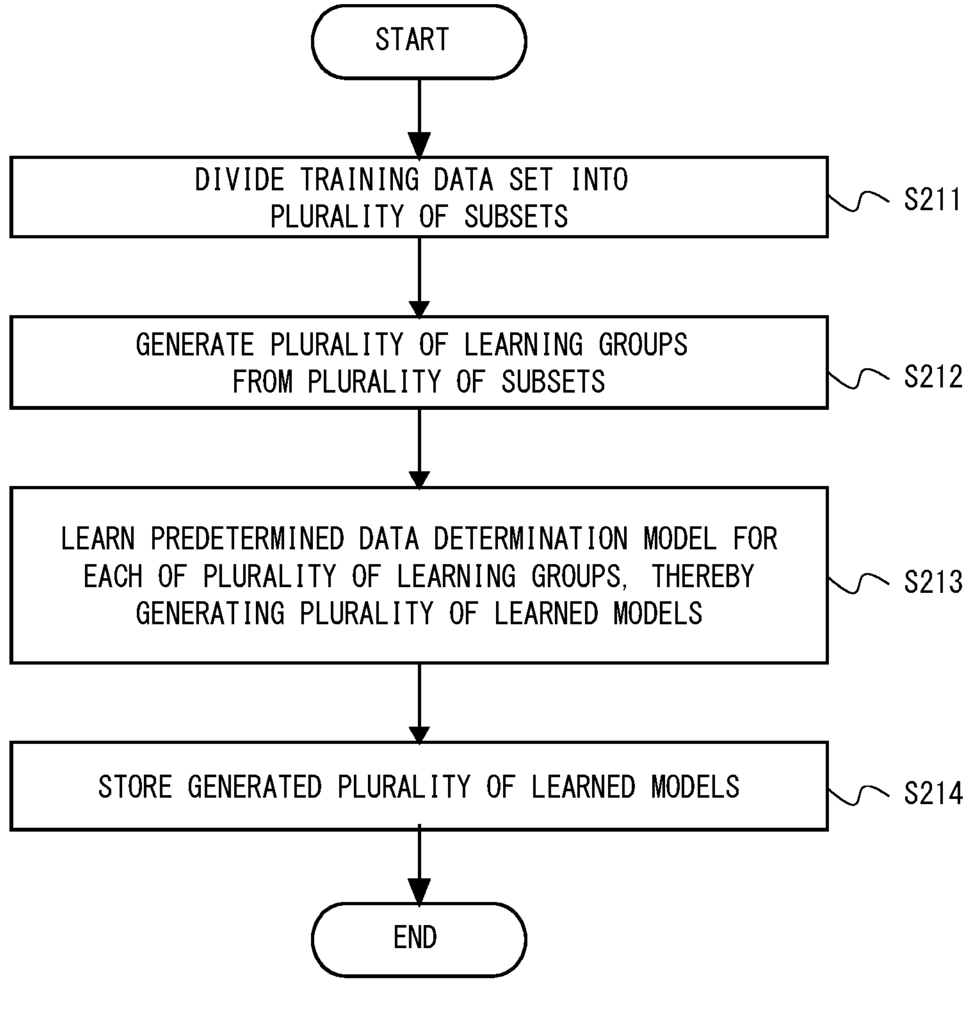
FIG. 4 is a flowchart showing a flow of processing in a learning stage according to the second example embodiment.
Figure 5:
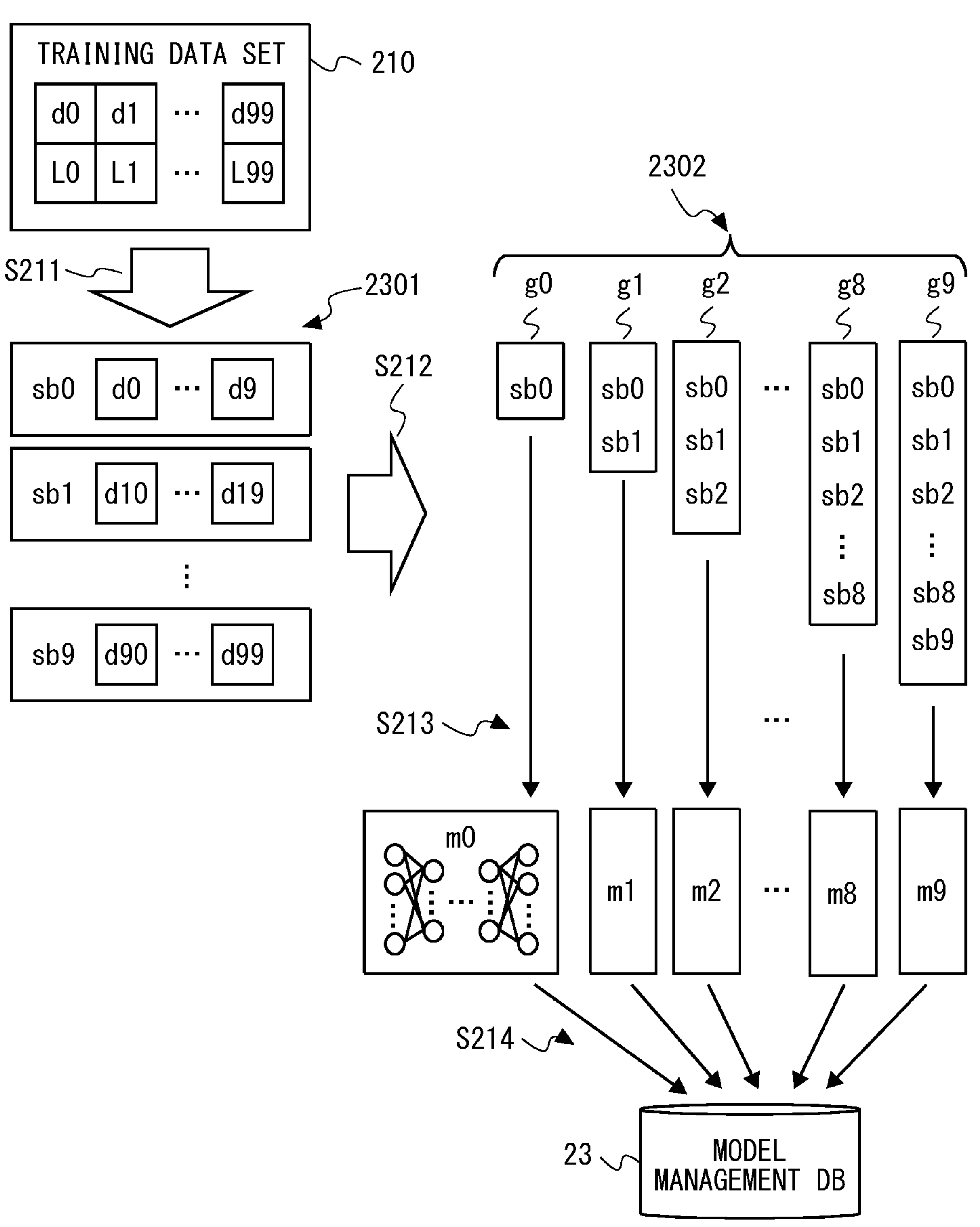
FIG. 5 is a diagram for describing a concept of a relation among a training data set, learning groups, and learned models according to the second example embodiment.

FIG. 4 is a flowchart showing a flow of processing in the learning stage according to the second example embodiment. Further, FIG. 5 is a diagram for describing a concept of a relation among a training data set, learning groups, and learned models according to the second example embodiment. In this example, the training data set 210 includes a pair of the sample do and the label L0, a pair of the sample d1 and the label L1, . . . and a pair of the sample d99 and the label L99. Further, in the following description, it is assumed that n is 10, and FIG. 5 is referred to as appropriate during the description of FIG. 4. However, n is not limited thereto.

First, the group generation unit 24 divides data from the training data set 210 into a plurality of subsets (S211). For example, the group generation unit 24 reads out the training data set 210 from the training data DB 21 and divides the training data in the training data set 210 into 10 subsets sb0-sb9. In this case, the group generation unit 24 generates definition information of a set of data inn each of the subsets sb0-sb9 as the data division information 2301 and stores the generated information in the model management DB 23. For example, 10 data pieces of samples d0-d9 are included in the subset sb0, 10 data pieces of samples d10-d19 are included in the subset sb1. Likewise, 10 data pieces of the samples d90-d99 are included in the subset sb9. Note that the number of pieces of data in each subset may not be even.

Next, the group generation unit 24 generates a plurality of learning groups from a plurality of subsets (S212). Specifically, the group generation unit 24 reads out the data division information 2301 from the model management DB 23, selects one of the plurality of subsets that has not yet been selected, and classifies the selected subset into a new learning group. For example, the group generation unit 24 selects the subset sb0 from the data division information 2301 and classifies the selected subset sb0 into a learning group g0. Next, the group generation unit 24 selects an unselected subset, which is the subset sb1 other than the subset sb0, from the data division information 2301, and collectively classifies the subset sb0 that belongs to the learning group g0 and the selected subset sb1 into a learning group g1. Next, the group generation unit 24 selects, for example, the subset sb2 from the data division information 2301 as an unselected subset, and collectively classifies the subsets sb0 and sb1 that belong to the learning group g1 and the selected subset sb2 into a learning group g2. Likewise, the group generation unit 24 generates the learning groups g3-g8. Then the group generation unit 24 selects the remaining subset sb9 from the data division information 2301 as an unselected subset, and collectively classifies the subsets sb0 to sb8 that belong to the learning group g8 and the selected subset sb9 into a learning group g9. The learning group g9 is the entire training data groups described above. Lastly, the group generation unit 24 generates definition information from the learning groups g0-g9 as learning group information 2302 and stores the definition information in the model management DB 23. Note that the group generation unit 24 may add the definition information of the learning group to the learning group information 2302 every time. While the group generation unit 24 generates the learning groups in an ascending order of the number of subsets in each learning group as one example in the above description, they may be generated in a descending order. Alternatively, the group generation unit 24 may generate a plurality of learning groups by another algorithm.

Next, the learning unit 25 learns a predetermined data determination model for each of the plurality of learning groups, thereby generating a plurality of learned models (S213). For example, the learning unit 25 reads out the learning group information 2302 from the model management DB 23, selects the learning group g0 from among the learning group information 2302, and acquires the training data group that corresponds to the learning group g0 (the pair of the sample d0 and the label L0—the pair of the sample d9 and the label L9) from the training data set 210. Then the learning unit 25 learns parameters of a predetermined data model using the pair of the sample d0 and the label L0—the pair of the sample d9 and the label L9 as training data, thereby generating the learned model m0. That is, the learned model m0 is a data determination model learned by the learning group g0 and the learned model m0 is associated with the learning group g0. Likewise, the learning unit 25 learns parameters of a data model similar to the above using the pair of the sample d10 and the label L10—the pair of the sample d19 and the label L19 defined in the learning group g1 as training data, thereby generating the learned model m1. Likewise, the learning unit 25 learns parameters of a data model similar to the above using the pair of the sample d90 and the label L90—the pair of the sample d99 and the label L99 defined in the learning group g9, thereby generating the learned model m9. Here, the learned model m9 is the aforementioned operation model. That is, the learned model m9 is a data determination model learned using all the data in the training data set 210.

The learning unit 25 then stores the generated learned models m0-m9 in the model management DB 23 as the learned models 231-23*n* (S214). After that, the user uses the learned model m9 (23*n*) stored in the model management DB 23 in the operation stage and uses this learned model m9 (23*n*) for determination of the operation data.

Figure 6:
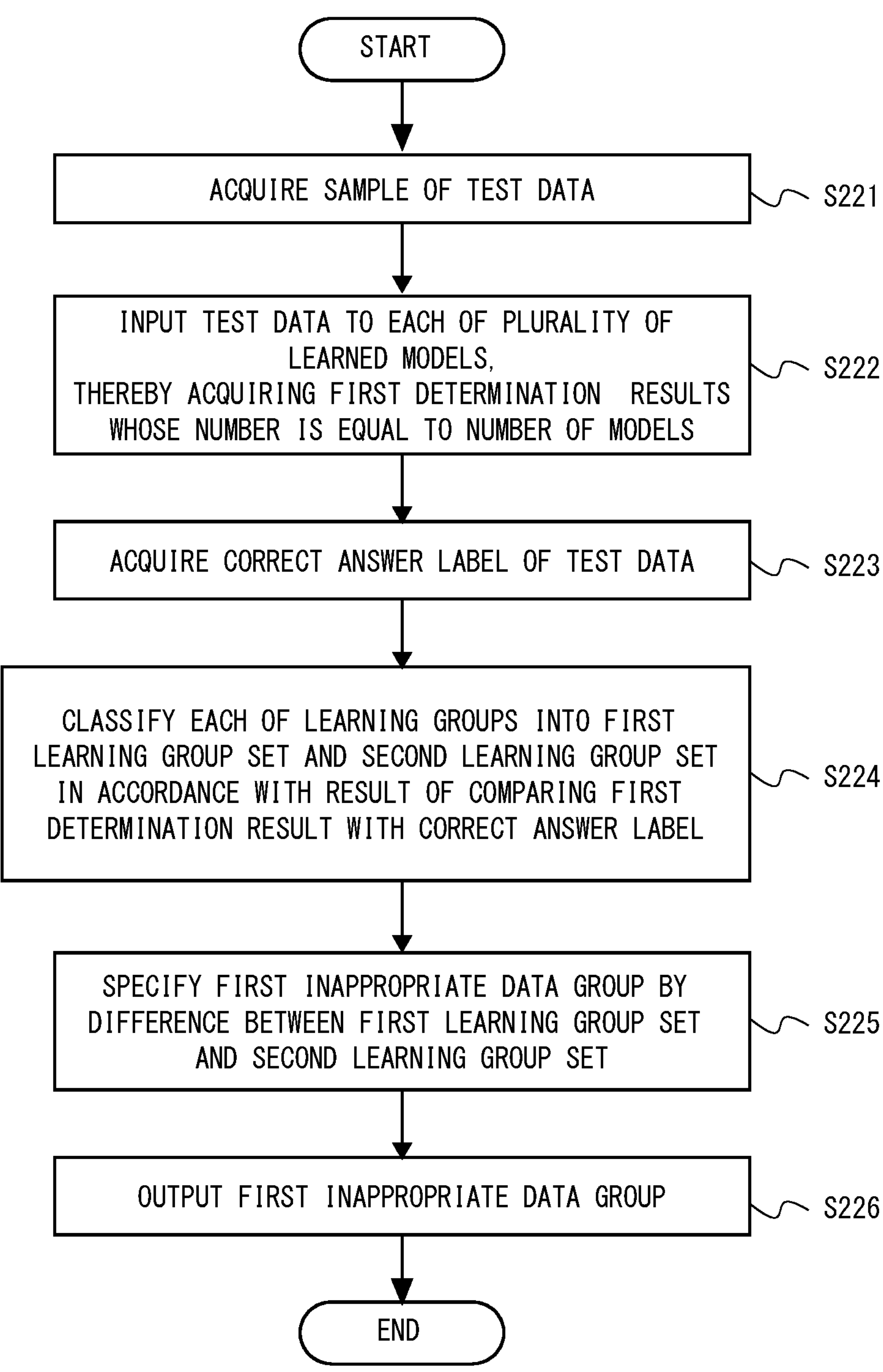
FIG. 6 is a flowchart showing a flow of primary specifying processing of an inappropriate data group according to the second example embodiment.
Figure 8:
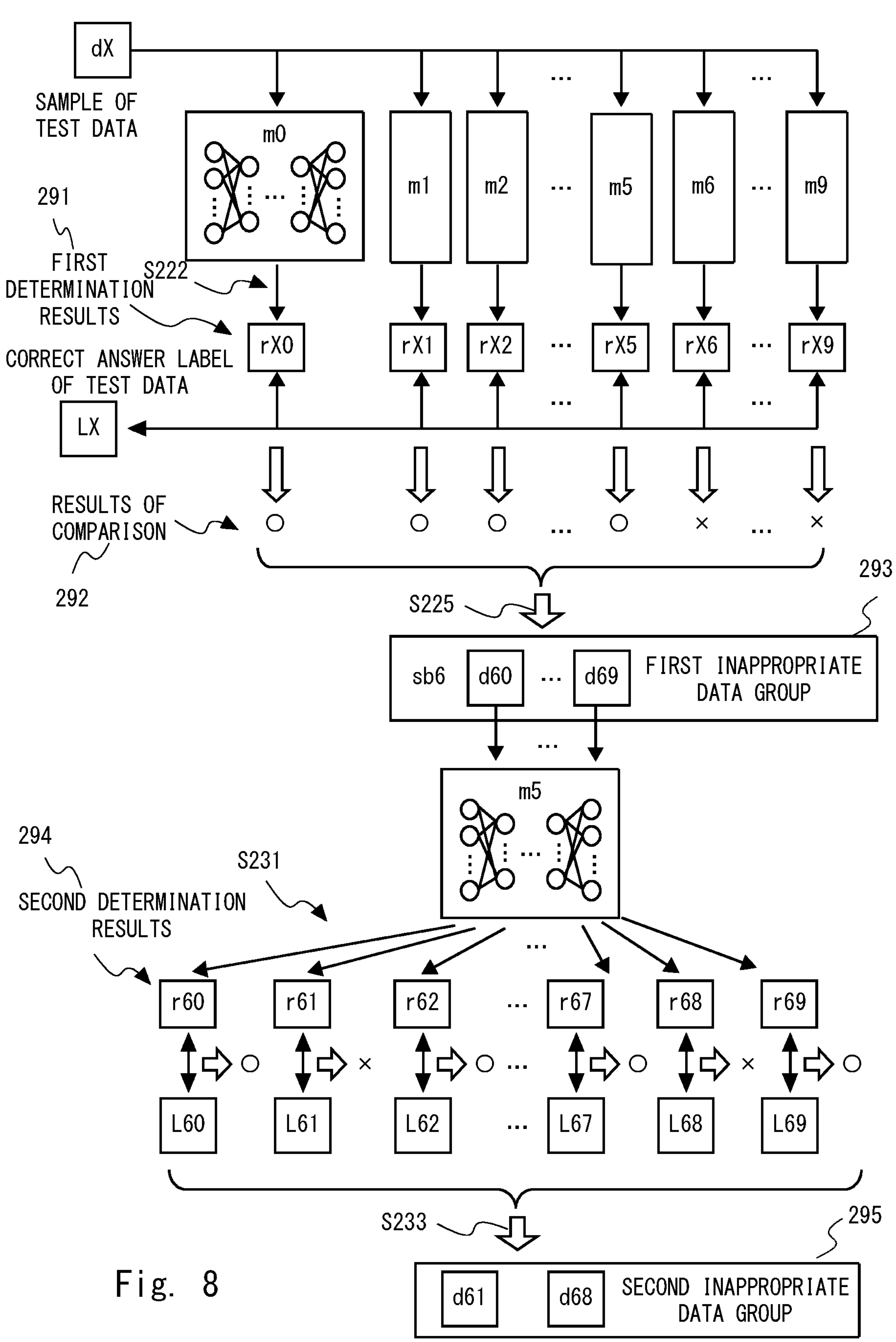
FIG. 8 is a diagram for describing a concept of specification of the inappropriate data group according to the second example embodiment.

FIG. 6 is a flowchart showing a flow of primary specifying processing of the inappropriate data group according to the second example embodiment. Further, FIG. 8 is a diagram for describing a concept of specification of the inappropriate data group according to the second example embodiment. The following description explains processing performed next to FIG. 5, and FIG. 8 is referred to as appropriate during the description of FIG. 6.

It is assumed here, for example, that, when the result of the determination by an operation model for the actual data in the operation stage is considered to be inappropriate for the user, this actual data is denoted by a sample dX of the test data (determination target data). As evaluation of the sample dX, a correct answer label that is appropriate for the user is denoted by LX. The number of pieces of actual data may be any number of one or more.

First, the determination unit 26 acquires the sample of the test data (S221). The determination unit 26 reads out, for example, the sample dX of the test data 221 from the test data DB 22. Alternatively, the determination unit 26 may receive the sample dX from an external device.

Next, the determination unit 26 inputs the sample dX of the test data to each of the learned models 231-23*n*, thereby acquiring first determination results 291 whose number is equal to the number of models (n) (S222). The determination unit 26 reads out, for example, the learned model m0 from the model management DB 23 and inputs the sample dX to the learned model m0. Then the determination unit 26 acquires a result of the determination rX0, which is a result of determination regarding the sample dX of the test data in the learned model m0. Likewise, the determination unit 26 inputs the sample dX of the same test data into each of the learned models m1-m9 and acquires the first determination results rX1-rX9 from the respective learned models.

Then the specifying unit 27 acquires the correct answer label of the test data (S223). The specifying unit 27 acquires, for example, the correct answer label LX in the sample dX of the test data from an external device.

Next, the specifying unit 27 classifies each of the learning groups into the first learning group set and the second learning group set in accordance with the result of comparing the first determination result 291 with the correct answer label LX (S224). The specifying unit 27 compares, for example, each of the first determination results rX0-rX9 with the correct answer label LX, thereby obtaining the results of the comparison 292. When, for example, the first determination result coincides with the correct answer label LX, the result of the comparison is indicated by "○". On the other hand, when the first determination result does not coincide with the correct answer label LX, the result of the comparison is indicated by "x". The result of the comparison is not limited to being indicated by two values of "○" and "x" and may be indicated by level values indicating a plurality of stages or scores or the like.

Then the specifying unit 27 classifies learning groups that correspond to the learning models whose results of the comparison are indicated by "○" into the first learning group set and classifies learning groups that correspond to the learned models whose results of the comparison are indicated by "x" into the second learning group set. It is assumed, in the example shown in FIG. 8, that learning groups g0-g5 are classified into the first learning group set and learning groups g6-g9 are classified into the second learning group set. This is because the data range of the learning group differs between learning groups that are adjacent to each other in the units of subsets. Another reason is that it has been focused on that, when learning is performed using a learning group including a subset including inappropriate data, the result of the determination by this learned model is highly likely to be different from the correct answer label.

Next, the specifying unit 27 specifies the first inappropriate data group by the difference between the first learning group set and the second learning group set (S225). For example, the specifying unit 27 classifies one of the first learning group set including the largest number of subsets into a first learning group g5. Further, the specifying unit 27 classifies one of the second learning group set including the smallest number of subsets into a second learning group g6. Then the specifying unit 27 specifies the subset sb6 (samples d60-d69), which is the difference between the first learning group g5 and the second learning group g6, as a first inappropriate data group 293.

It can be said that the accuracy of the determination of a data determination model that has learned the largest number of pieces of training data in a range in which there is no training data (inappropriate data) to which an inappropriate label is attached is the highest. In other words, it can be said that the accuracy of the determination of a data determination model that has learned the smallest number of pieces of training data in a range including inappropriate data is the lowest. When, for example, inappropriate data is included in the learning group g6, a learned model m5 is likely to output a correct result of the determination and the learned model m6 is likely to output an incorrect result of the determination. In this way, when the learned model m5 has output the correct result of the determination and the learned model m6 has output the incorrect result of the determination, it can be determined that one of the pieces of training data included in the training data set 210 is inappropriate.

After that, the output unit 28 outputs the specified first inappropriate data group 293 (S226). For example, samples d60-d69 that are included in the subset sb6 are output as the first inappropriate data group 293. Accordingly, the user is able to know that the samples d60-d69 among the training data set 210 are highly likely to be inappropriate data, and to separately review the consistency with the label among them. That is, the user does not have to review all the data in the training data set 210 and only needs to review the training data group that has been narrowed down, whereby the reviewing process can be made efficient.

Note that not all the labels in the first inappropriate data group are inappropriate. A case in which the machine learning apparatus 2 continues to narrow down inappropriate data more specifically from among the first inappropriate data group will be described.

Figure 7:
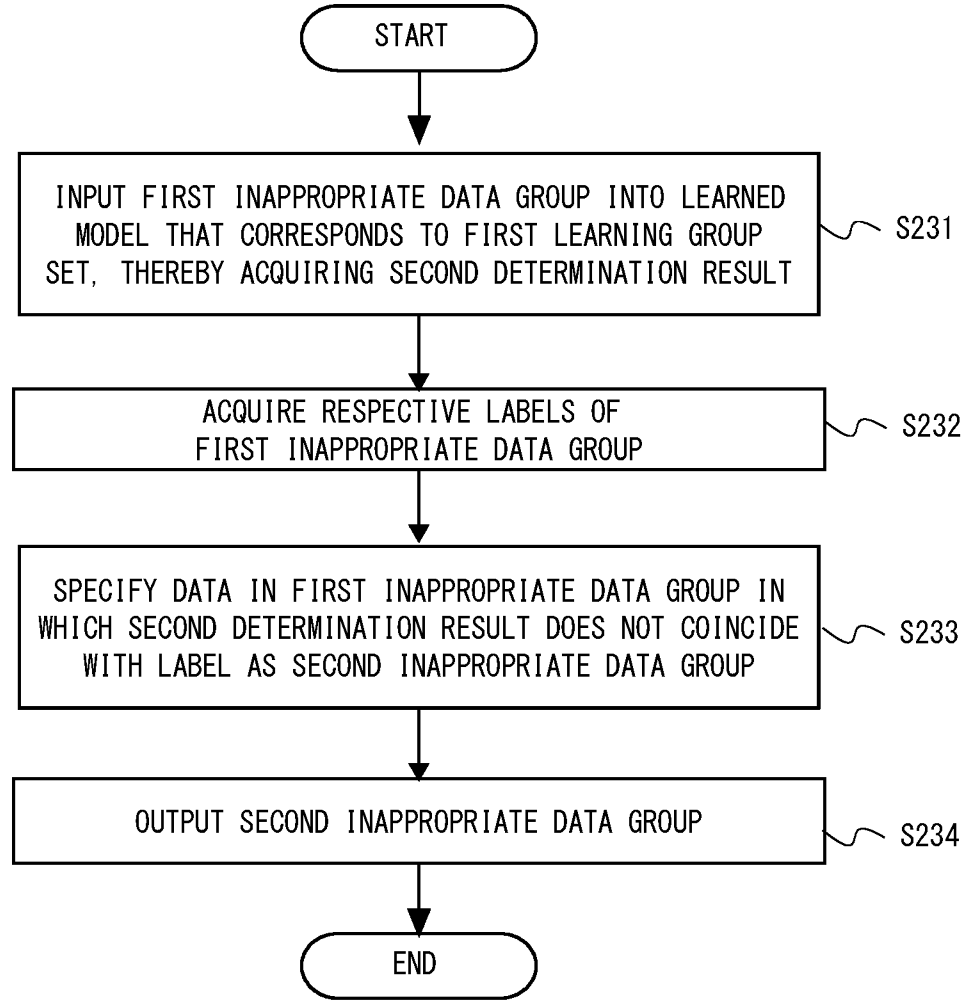
FIG. 7 is a flowchart showing a flow of secondary specifying processing of the inappropriate data group according to the second example embodiment.

FIG. 7 is a flowchart showing a flow of secondary specifying processing of the inappropriate data group according to the second example embodiment. The following description explains processing performed next to FIG. 6, and FIG. 8 is referred to as appropriate during the description of FIG. 7.

First, the determination unit 26 acquires the first learning group set classified in Step S224 and the first inappropriate data group 293 specified in Step S225. Then the determination unit 26 inputs the first inappropriate data group 293 into the learned model that corresponds to the first learning group set, thereby acquiring a second determination result (S231). For example, the determination unit 26 specifies the learned model m5 that corresponds to the learning group g5 among the first learning group set. Then the determination unit 26 inputs each of the samples d60-d69 that are included in the subset sb6 to the learned model m5, thereby acquiring second determination results 294. That is, the determination unit 26 inputs the sample d60 into the learned model m5, thereby acquiring a second determination result r60. Likewise, the determination unit 26 inputs each of the samples d61-d69 to the learned model m5, thereby acquiring second determination results r61-r69.

Then the specifying unit 27 acquires the respective labels of the first inappropriate data group 293 (S232). For example, the specifying unit 27 acquires the labels L60-L69 that correspond to the respective samples d60-d69 from the training data DB 21.

Next, the specifying unit 27 specifies data in the first inappropriate data group 293 in which the second determination results 294 do not coincide with a label as a second inappropriate data group 295 (S233). It is assumed, for example, that the specifying unit 27 compares the second determination result r60 of the sample d60 with the label L60 attached to the sample d60 and determines that the second determination result r61 coincides with the label L60. In this case, the specifying unit 27 does not include the sample d60 in the second inappropriate data group 295. Likewise, the specifying unit 27 compares the second determination results r61-r69 with the respective labels L61-L69. In this example, the specifying unit 27 includes the samples d61 and d68 in the second inappropriate data group 295.

Then the output unit 28 outputs the second inappropriate data group 295 (S234). For example, the samples d61 and d68 that are included in the subset sb6 are output as the second inappropriate data group 295. Accordingly, the user is able to know that the samples d61 and d68 are data that are highly likely to be inappropriate data among the samples that are included in the subset sb6, which is the first inappropriate data group 293. Therefore, it is possible to review data more efficiently than in a case in which all the first inappropriate data groups are reviewed.

While one of the learned models that correspond to the first learning group set has been used in Step S231, this is merely one example and two or more learned models that correspond to the first learning group set may instead be used. In this case, it is possible to specify the second inappropriate data group by the second determination result by each of the plurality of learned models for each of the samples that belong to the first learning group set, whereby the accuracy can be further improved.

Figure 9:
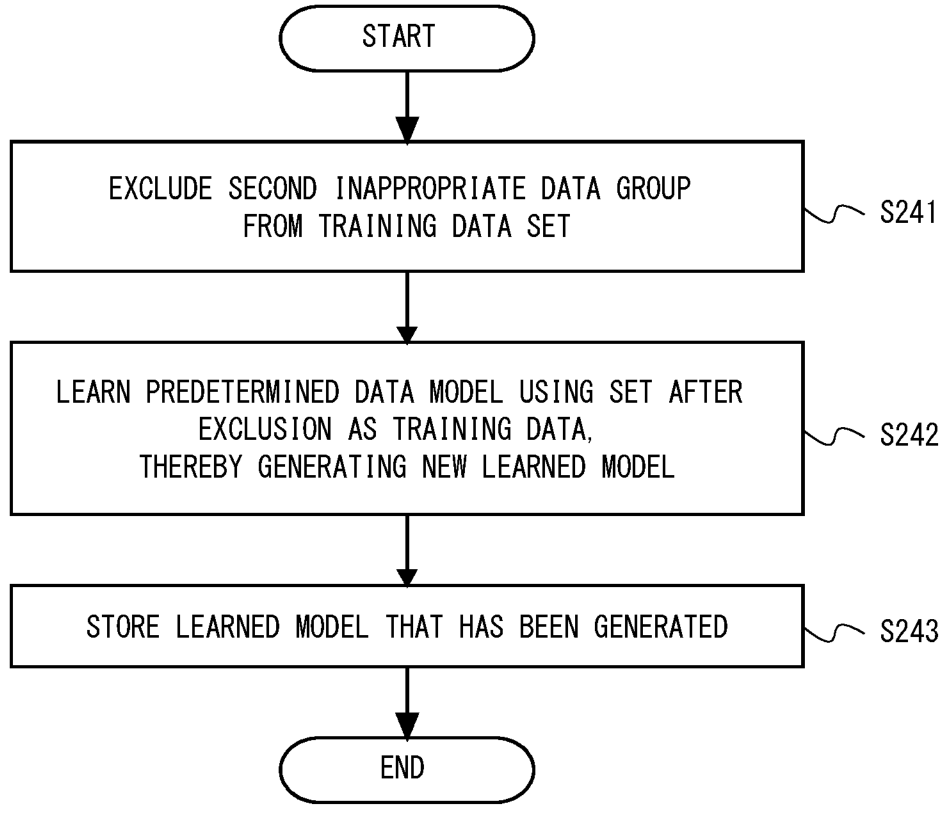
FIG. 9 is a flowchart showing a flow of processing of relearning performed after inappropriate data is excluded according to the second example embodiment.
Figure 10:
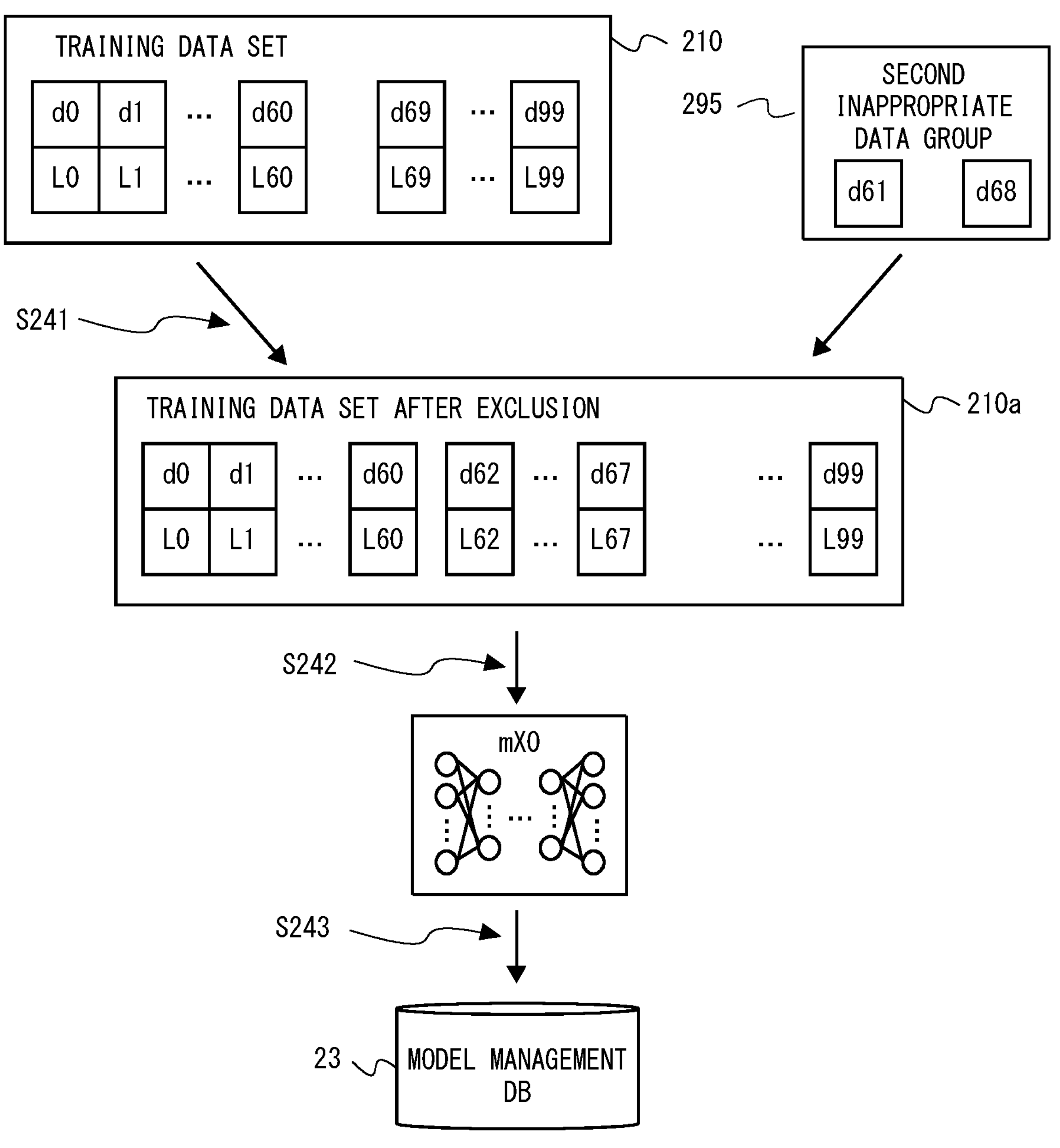
FIG. 10 is a diagram for describing a concept of relearning performed after the inappropriate data is excluded according to the second example embodiment.

Next, processing for improving the accuracy of the operation model by specification of the inappropriate data will be described. FIG. 9 is a flowchart showing a flow of processing of relearning after the inappropriate data is excluded according to the second example embodiment. Further, FIG. 10 is a diagram for describing a concept of relearning after the inappropriate data is excluded according to the second example embodiment. The following description explains processing performed next to FIG. 8, and FIG. 10 is referred to as appropriate during the description of FIG. 9.

First, the learning unit 25 acquires the second inappropriate data group 295 specified in Step S233. Then the learning unit 25 excludes the second inappropriate data group 295 from the training data set 210 (S241). For example, the learning unit 25 excludes the samples d61 and d68 included in the second inappropriate data group 295 from the training data set 210 to obtain a training data set 210*a*.

Then the learning unit 25 learns a predetermined data determination model using the training data set after the inappropriate data has been excluded 210*a* as training data, thereby generating a new learned model mX0 (S242). The learning unit 25 then stores the learned model mX0 that has been just generated in the model management DB 23 (S243).

Since the learned model mX0 is a new operation model and is learned using the training data set 210*a* from which the inappropriate data has been excluded, the accuracy of the determination of the learned model mX0 is higher than that of the learned model m9, which is the operation mode originally used.

From the above description, according to the second example embodiment, it is possible to detect the presence of inappropriate data based on the first determination results by a plurality of data determination models whose ranges of the training data are different from one another, and narrow down the range where the inappropriate data group exists in the training data set 210. Therefore, for example, for the data determination model (operation model) that has already been completed and operated, it is possible to efficiently detect the presence of training data whose label attached thereto is incorrect and specify the range among the training data set 210 used at the time of learning of the operation model.

In particular, if there is any doubt about the accuracy of the determination of the data determination model after the learning of the data determination model is completed and this model has actually been operated, the range of the training data set used at the time of learning that contains inappropriate data can be limited. The reason therefor is that, by preparing a plurality of data determination models that have learned only a part of the training data, it is possible to check the difference between the output of the data determination models that have learned only normal training data and the output of the data determination models that have learned training data including inappropriate data.

Third Example Embodiment

A third example embodiment is a modified example of the aforementioned second example embodiment. A determination unit according to the third example embodiment inputs training data among the training data set that is not included in the corresponding learning group as determination target data to each learned model, thereby acquiring the respective first determination results. Then the specifying unit specifies a second inappropriate data group from the result of comparing the first determination results from each of the learned models with the label with respect to the same determination target data. Accordingly, it is possible to efficiently specify the inappropriate data even in the learning stage.

Since the other configurations and processing of the machine learning apparatus according to the third example embodiment are similar to those of the aforementioned second example embodiment, they are not shown in the drawings and the detailed descriptions will be omitted.

Figure 11:
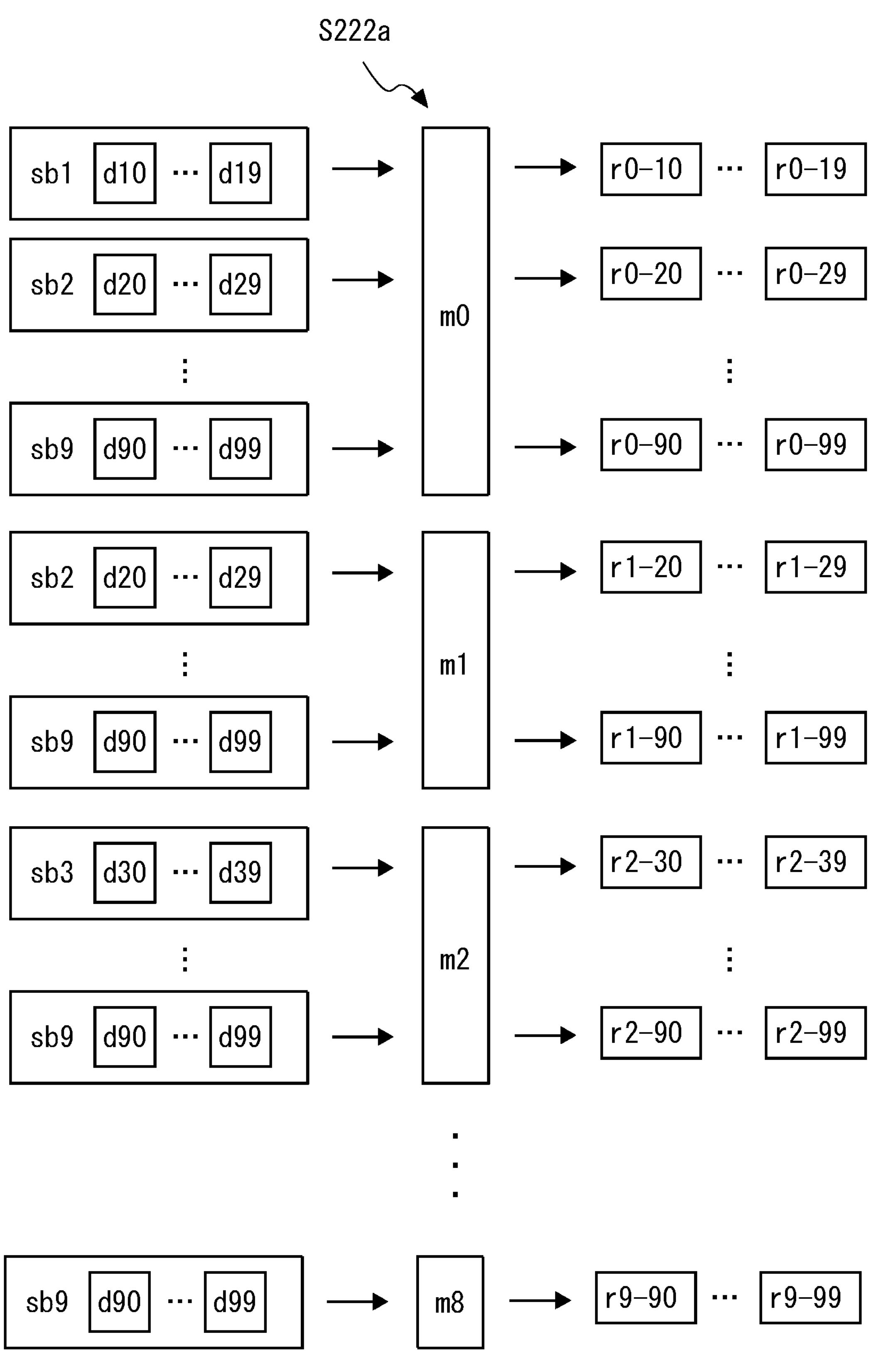
FIG. 11 is a diagram for describing a concept of detection of inappropriate data in a learning stage according to a third example embodiment.
Figure 12:
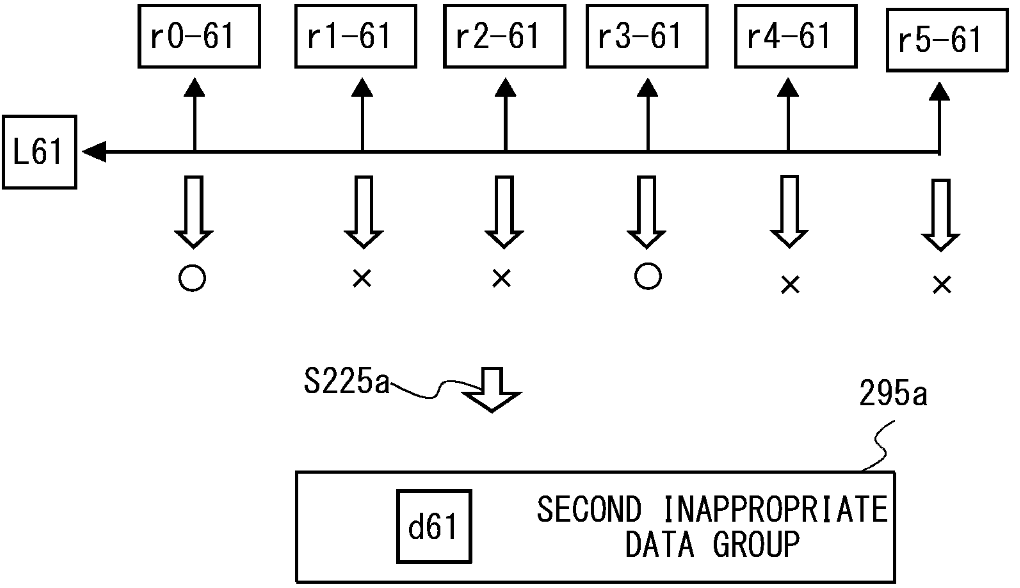
FIG. 12 is a diagram for describing a concept of detection of inappropriate data in the learning stage according to the third example embodiment.

FIGS. 11 and 12 are diagrams for describing a concept of detection of inappropriate data in a learning stage according to the third example embodiment. It is assumed that the processing of up to the processing in FIG. 4 is similar to that described in the second example embodiment. It is assumed, for example, as shown in FIG. 5, the training data set 210 is divided into a plurality of subsets sb0-sb9, a plurality of learning groups g0-g9 are generated, and learned models m0-m9 have already been generated for the respective learning groups.

The determination unit 26 according to the third example embodiment acquires the learning model m0 from the model management DB 23, specifies the training data group other than the learning group g0 that corresponds to the learned model m0, and acquires the specified training data group from the training data DB 21. That is, the determination unit 26 acquires the samples d10-d99 of the subsets sb1 to sb9 that are not included in the learning group g0. Then the determination unit 26 inputs each of the samples d10-d99 into the learned model m0, thereby acquiring first determination results r0-10 to r0-99. Further, the determination unit 26 acquires the learned model m1 from the model management DB 23 and acquires samples d20-d99 of the subsets sb2-sb9 that are not included in the learning group g1. Then the determination unit 26 inputs each of the samples d20-d99 into the learned model m1, thereby acquiring first determination results r1-20 to r1-99. Likewise, the determination unit 26 inputs each of the samples d90-d99 into the learned model m8, thereby acquiring first determination results r8-90 to r8-99 (S222*a*).

After that, the specifying unit 27 according to the third example embodiment acquires, for example, the label L61 attached to the sample d61 from the training data DB 21 and compares each of the first determination results r0-61, r1-61, r2-61, r3-61, r4-61, and r5-61 with the label L61. Then the specifying unit 27 specifies the target sample d61 as the second inappropriate data group 295*a* when a predetermined number or more of the results of the comparison are inappropriate (S225*a*).

As described above, according to the third example embodiment, it is possible to detect training data to which an inappropriate label is attached in the learning stage, not in the operation stage. Therefore, the accuracy of the operation model can be improved in an early stage or in parallel with the operation.

Fourth Example Embodiment

A fourth example embodiment is a modified example of the second or third example embodiment described above. A group generation unit according to the fourth example embodiment generates each of a plurality of learning groups so that it includes at least a subset that does not belong to any of the other groups. Accordingly, the difference in the result of the determination of a learned model due to the presence or the absence of inappropriate data becomes more significant, whereby it is possible to specify the first inappropriate data group more clearly. In particular, it is possible to easily detect inappropriate data in the learning stage.

Furthermore, the group generation unit according to the fourth example embodiment may further include, in a plurality of learning groups, learning groups including a subset that is included in a plurality of learning groups in common. Accordingly, it is possible to improve the accuracy of detecting inappropriate data from a common subset.

Since the other configurations and processing of the machine learning apparatus according to the fourth example embodiment are similar to those of the second or third example embodiment described above, they are not shown in the drawings and the detailed descriptions will be omitted.

Figure 13:
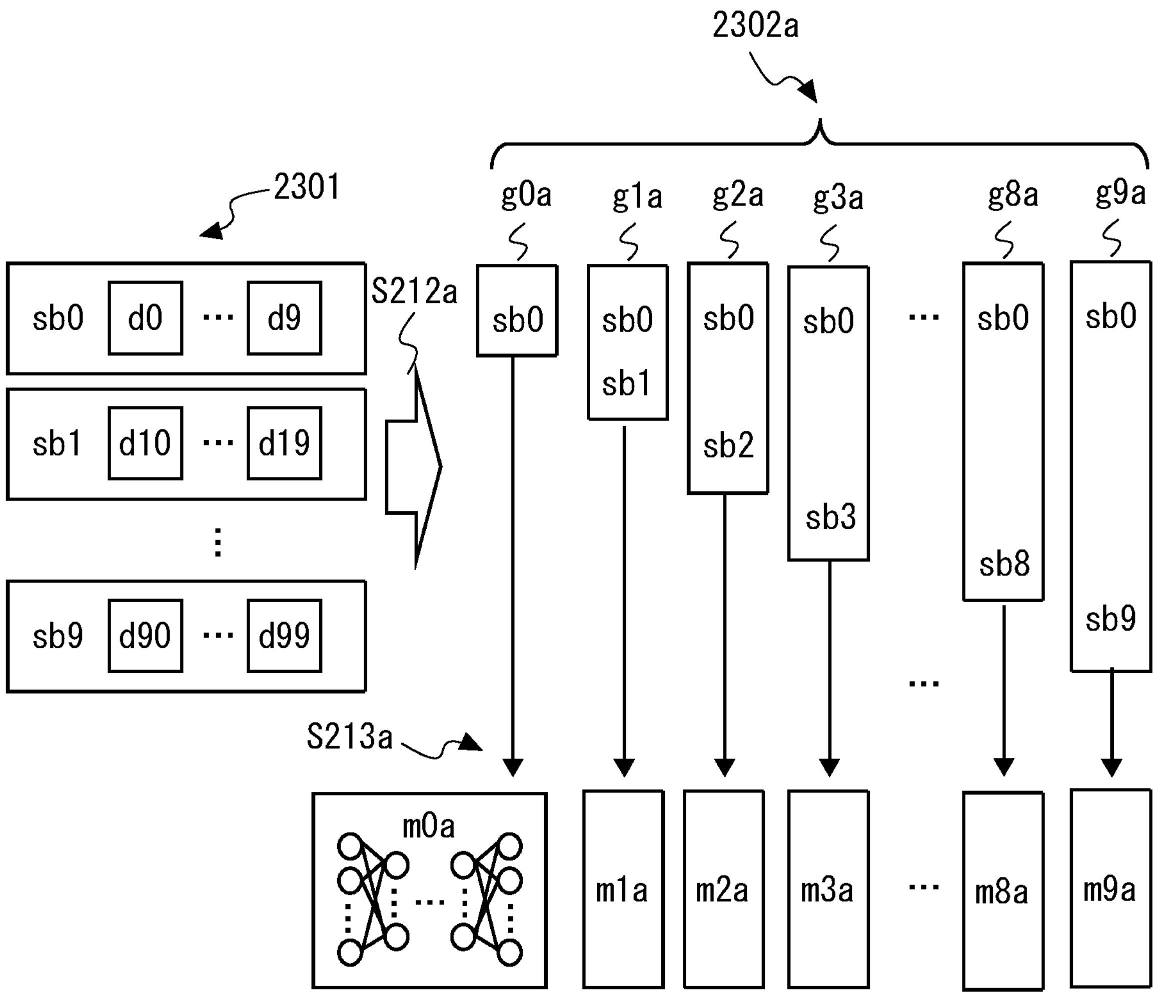
FIG. 13 is a diagram for describing a concept of a relation among subsets, learning groups, and learned models according to a fourth example embodiment.

FIG. 13 is a diagram for describing a concept of a relation among subsets, learning groups, and learned models according to the fourth example embodiment. It is assumed that the processing of up to the processing of Step S11 in FIG. 4 is similar to that described in the second example embodiment. It is assumed, for example, that the training data set 210 has already been divided into a plurality of subsets sb0-sb9 as shown in FIG. 5.

The group generation unit 24 according to the fourth example embodiment includes a subset sb0 in each of learning groups gOa-g9*a* in common (S212*a*). For example, the group generation unit 24 defines the subset sb0 as a common subset for each learning group. Then the group generation unit 24 selects a subset sb2 from the data division information 2301 and collectively classifies the subset sb0 and the selected subset sb2 into a learning group g2*a*. That is, the group generation unit 24 does not include a subset sb1 in the learning group g2*a*. Then the group generation unit 24 selects a subset sb3 from the data division information 2301 and collectively classifies the subset sb0 and the selected subset sb3 into a learning group g3*a*. Likewise, the group generation unit 24 selects the subset sb9 from the data division information 2301 and collectively classifies the subset sb0 and the selected subset sb9 into a learning group g9*a*. Further, the group generation unit 24 generates the definition information of the learning groups g0*a*-g9*a* as learning group information 2302*a* and stores this information in the model management DB 23. Note that the group generation unit 24 may separately generate a learning group including all the data in the training data set 210.

After that, like in Step S213, the learning unit 25 according to the fourth example embodiment learns a predetermined data determination model for each of the plurality of learning groups g0*a*-g9*a*, thereby generating a plurality of learned models m0*a*-m9*a* (S213*a*). It is assumed that the learning unit 25 separately generates a learned model (operation model) obtained by learning a predetermined data determination model using all the data in the training data set 210 as training data.

After that, primary specifying processing of the inappropriate data group shown in FIG. 6 is performed by determination target data other than the training data set 210. In this case, when the first determination result is different from the correct answer label in all or the most of the learned models m0*a*-m9*a*, it is highly likely that the inappropriate data has been included in the subset sb0 that is common to each learning group. On the other hand, when a first determination result in one of the learned models m1*a* to m9*a* is different from the correct answer label, it is highly likely that inappropriate data is included in a subset other than the subset sb0 included in the learning group used for the learning of the learned model. Therefore, it can be said that it is possible to specify inappropriate data more efficiently in the fourth example embodiment than in the other example embodiments.

Other Example Embodiments

Note that the method of generating the learning group by the aforementioned group generation unit, in particular, the way in which subsets are combined is not limited to the above-described ones and various combinations may be employed. Further, the division number of the subsets, the number of learning groups, the number of learned models, and the predetermined number n are not limited to 10 and may be any number equal to or larger than two. As the value of n decreases, a range where inappropriate data may exist becomes wider, whereas the number of resources that are necessary becomes smaller. On the other hand, as the value of n increases, the number of resources increases, whereas it is possible to narrow down the range where inappropriate data may exist. Further, when n data determination models are created, the training data may be divided into n, not into 10.

Further, the group generation unit may generate each learning group in such a way that it includes all the subsets from which each different subset is excluded. For example, the subsets sb1-sb9 other than the subset sb0 may be included in the first learning group and the subsets sb0 and sb2-sb9 other than the subset sb1 may be included in the second learning group. Likewise, the subsets sb0-sb8 other than the subset sb9 may be included in the tenth learning group. In this case, each learned model learned for each of the first to tenth learning groups is learned using most of the training data set 210. Therefore, each learned model is close to the operation model regarding the amount of the training data. Therefore, even if there is any doubt about the result of the determination by the operation model in the operation stage, it is possible to specify a subset including an inappropriate data group according to this example embodiment. Then a learning group that does not include a specified subset and includes all the other subsets can be specified. That is, a learned model by a learning group from which a specified inappropriate data group has been excluded has already been generated. Therefore, the operation model learned by the entire training data can be replaced by the learned model by the learning group from which the inappropriate data group has been excluded, whereby the operation can be restarted quickly.

While the present disclosure has been described as a hardware configuration in the aforementioned example embodiments, this is merely an example. The present disclosure may achieve arbitrary processing by causing a CPU to execute a computer program.

In the aforementioned examples, the program can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g. magneto-optical disks), CD-ROM (Read Only Memory), CD-R, CD-R/W, DVD (Digital Versatile Disc), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Note that the present disclosure is not limited to the above example embodiments and may be changed as appropriate without departing from the spirit of the present disclosure. Further, the present disclosure may be executed by combining some of example embodiments as appropriate.

The whole or a part of the exemplary embodiments disclosed above can be described as, but not limited to, the following supplementary notes.

(Supplementary Note A1)

A machine learning apparatus comprising:

a storage unit configured to store a training data set, which is a plurality of pieces of training data, each of the pieces of training data being a pair of data and a label;

a group generation unit configured to generate, from the training data set, a plurality of learning groups having data at least respective parts of which are different from each other;

a learning unit configured to learn a predetermined data determination model for each of the plurality of learning groups and store a plurality of learned models that correspond to the respective learning groups in the storage unit;

a determination unit configured to input, to each of the plurality of learned models, determination target data that is not included in the corresponding learning group, and acquire first determination results whose number corresponds to that of the learned models; and a specifying unit configured to specify a first inappropriate data group in which the label is possibly inappropriate from the training data set based on the first determination results and a correct answer label in the determination target data.

(Supplementary Note A2)

The machine learning apparatus according to Supplementary Note A1, wherein the specifying unit compares each of the first determination results with the correct answer label, the specifying unit specifies first learning group set of the plurality of learning groups that correspond to the learned model in which the result of the comparison shows a coincidence and second learning group set of the plurality of learning groups that correspond to the learned model in which the result of the comparison does not show a coincidence, and the specifying unit specifies the first inappropriate data group from the difference between the first learning group set and the second learning group set.

(Supplementary Note A3)

The machine learning apparatus according to Supplementary Note A2, wherein the determination unit inputs the first inappropriate data group to at least one learned model that corresponds to the first learning group set, thereby acquiring a second determination result, the specifying unit specifies one or more pieces of data of the first inappropriate data group in which the second determination result does not coincide with the label as a second inappropriate data group, and the learning unit learns the predetermined data determination model using a set obtained by excluding the second inappropriate data group from the training data set as the training data, and stores a new learned model in the storage unit.

(Supplementary Note A4)

The machine learning apparatus according to any one of Supplementary Notes A1 to A3, wherein the plurality of learning groups includes an entire training data group including all the data in the training data set, the learning unit stores the learned model generated by learning the predetermined data determination model using the entire training data group as the training data in the storage unit as an operation model, and the determination unit inputs operation data externally acquired to the operation model as the determination target data.

(Supplementary Note A5)

The machine learning apparatus according to any one of Supplementary Notes A1 to A4, wherein the group generation unit divides the training data set into a plurality of subsets whose number is a predetermined number and whose data do not overlap each other, and the group generation unit generates the plurality of learning groups in such a way that each of the plurality of subsets belongs to at least one group.

(Supplementary Note A6)

The machine learning apparatus according to Supplementary Note A5, wherein the group generation unit divides the training data set into the plurality of subsets in such a way that the number of pieces of data in each subset becomes even, and the specifying unit specifies one of the plurality of subsets as the first inappropriate data group.

(Supplementary Note A7)

The machine learning apparatus according to any one of Supplementary Note A5 or A6, wherein the group generation unit generates the plurality of learning groups in such a way that the number of subsets in each learning group is different from each other within the predetermined number.

(Supplementary Note A8)

The machine learning apparatus according to any one of Supplementary Notes A5 to A7, wherein the group generation unit generates an N-th learning group so as to include all the subsets in an (N−1)-th (N is a natural number equal to or larger than two but equal to or smaller than the number of subsets in each learning group) learning group in an ascending order of the number of subsets in each learning group and one of the plurality of subsets that does not belong to the (N−1)-th learning group.

(Supplementary Note A9)

The machine learning apparatus according to Supplementary Note A8 that depends from Supplementary Note A2, wherein the specifying unit specifies the difference between first learning group and second learning group as the first inappropriate data group, the first learning group including the largest number of subsets among the first learning group set and the second learning group including the smallest number of subsets among the second learning group set.

(Supplementary Note A10)

The machine learning apparatus according to Supplementary Note A5, wherein the group generation unit generates each of the plurality of learning groups in such a way that it includes at least a subset that does not belong to any of the other groups.

(Supplementary Note A11)

The machine learning apparatus according to Supplementary Note A10, wherein the group generation unit further includes, in the plurality of learning groups, learning groups including a subset that is included in the plurality of learning groups in common.

(Supplementary Note B1)

A machine learning method, wherein a computer generates a plurality of learning groups having data at least respective parts of which are different from each other from a training data set, which is a plurality of pieces of training data, each of the pieces of training data being a pair of data and a label, the computer learns a predetermined data determination model for each of the plurality of learning groups, thereby generating a plurality of learned models that correspond to the respective learning groups, the computer inputs, to each of the plurality of learned models, determination target data that is not included in the corresponding learning group, thereby acquiring first determination results whose number corresponds to that of the learned models, and the computer specifies a first inappropriate data group in which the label is possibly inappropriate from the training data set based on the first determination results and a correct answer label in the determination target data.

(Supplementary Note C1)

A machine learning program for causing a computer to execute the following processing of:

generating a plurality of learning groups having data at least respective parts of which are different from each other from a training data set, which is a plurality of pieces of training data, each of the pieces of training data being a pair of data and a label;

learning a predetermined data determination model for each of the plurality of learning groups, thereby generating a plurality of learned models that correspond to the respective learning groups;

inputting, to each of the plurality of learned models, determination target data that is not included in the corresponding learning group, and acquiring first determination results whose number corresponds to that of the learned models; and specifying a first inappropriate data group in which the label is possibly inappropriate from the training data set based on the first determination results and a correct answer label in the determination target data.

While the present disclosure has been described with reference to the example embodiments (and examples), the present disclosure is not limited by the above example embodiments (and examples). Various changes that may be understood by those skilled in the art may be made to the configurations and the details of the present disclosure within the scope of the present disclosure.

This application is based upon and claims the benefit of priority from Japanese Patent Application No. 2019-016650, filed on Feb. 1, 2019, the disclosure of which is incorporated herein in its entirety by reference.

REFERENCE SIGNS LIST

1 Machine Learning Apparatus
11 Storage Unit
110 Training Data Set
111 Training Data
1111 Data
1112 Label
112 Training Data
12 Group Generation Unit
13 Learning Unit
14 Determination Unit
15 Specifying Unit
161 Learned Model
**16*n*** Learned Model
2 Machine Learning Apparatus
21 Training Data DB
210 Training Data Set
**210*a*** Training Data Set
211 Training Data
2111 ID
2112 Sample
2113 Label
212 Training Data
22 Test Data DB
221 Test Data
2211 ID
2212 Sample
222 Test Data
23 Model Management DB
2301 Data Division Information
2302 Learning Group Information
231 Learned Model
**23*n*** Learned Model
24 Group Generation Unit
25 Learning Unit
26 Determination Unit
27 Specifying Unit
28 Output Unit
291 First Determination Results
292 Results of Comparison
293 First Inappropriate Data Group
294 Second Determination Results
295 Second Inappropriate Data Group
**295*a*** Second Inappropriate Data Group
d0-d99 Sample
L0-L99 Label
sb0-sb9 Subset
g0-g9 Learning Group
g**0*a*-g9*a*** Learning Group
m0-m9 Learned Model
dX Sample of Test Data
LX Correct Answer Label
mX0 Learned Model
r0-r99 Result of Determination
rX0-rX9 Result of Determination
r0-0-r0-99 Result of Determination
r1-0-r1-99 Result of Determination
r9-0-r9-99 Result of Determination

What is claimed is:

1. A machine learning apparatus comprising:

a storage apparatus configured to store a training data set, which is a plurality of pieces of training data, where each of the pieces of training data is a pair of data and a label;

at least one memory configured to store instructions; and at least one processor configured to execute the instructions to:

divide the training data set into a plurality of subsets, wherein a number of the plurality of data sets is a predetermined number, the plurality of data sets each have data that does not overlap the data of any other of the plurality of data sets, and the training data set is divided into the plurality of subsets such that a number of the pieces of the training data in each subset is even;

generate, from the training data set, a plurality of learning groups having data at least respective parts of which are different from each other, wherein the plurality of learning groups includes an entire training data group including all data in the training data set, and wherein the plurality of learning groups is generated such that each of the plurality of subsets into which the training data set has been divided belongs to at least one of the plurality of learning groups;

learn a predetermined data determination model for each of the plurality of learning groups;

store a plurality of learned models that correspond to the respective learning groups, including storing the learned model generated by learning the predetermined data determination model using the entire training data group as training data, as an operation model;

input, to each of the plurality of learned models, determination target data that is not included in the corresponding learning group, wherein the determination target data is input operation data that is externally acquired;

acquire a number of first determination results corresponding to a number of the learned models; and specify a first inappropriate data group in which the label has a possibility of being inappropriate from the training data set based on the first determination results and a correct answer label in the determination target data, wherein the at least one processor is configured to execute the instructions to further:

compare each of the first determination results with the correct answer label, specify a first learning group set of the plurality of learning groups that correspond to the learned model in which a comparison result indicates a coincidence and second learning group set of the plurality of learning groups that correspond to the learned model in which the result of the comparison does not show a coincidence, wherein the first inappropriate data group is specified from the difference between the first learning group set and the second learning group set, the first inappropriate data group is specified such that the number of the pieces of the training data in each subset is even, and the first inappropriate data group is specified as one of the plurality of subsets:

input the first inappropriate data group to at least one learned model that corresponds to the first learning group set, thereby acquiring a second determination result; and specify one or more pieces of data of the first inappropriate data group in which the second determination result does not coincide with the label as a second inappropriate data group, wherein the predetermined data determination model is learned using a set obtained by excluding the second inappropriate data group from the training data set as the training data, and a new learned model is then stored, in learning the data determination model, parameters of the data determination model are learned after removal of training data to which an incorrect label is attached, such that the training data that is selected is reduced, thereby reducing cost.

2. The machine learning apparatus according to claim 1, wherein the at least one processor is configured to execute the instructions to further:

generate the plurality of learning groups such that the number of subsets in each learning group is different from each other within the predetermined number.

3. The machine learning apparatus according to claim 1, wherein the at least one processor is configured to execute the instructions to further:

generate an N-th learning group so as to include all the subsets in an (N−1)-th learning group in an ascending order of the number of subsets in each learning group and one of the plurality of subsets that does not belong to the (N−1)-th learning group, wherein N is equal to or larger than two but is equal to or smaller than the number of subsets in each learning group.

4. The machine learning apparatus according to claim 1, wherein the at least one processor is configured to execute the instructions to further:

generate each of the plurality of learning groups in such a way that it includes at least a subset that does not belong to any of the other groups.

5. The machine learning apparatus according to claim 4, wherein the at least one processor is configured to execute the instructions to further:

include, in the plurality of learning groups, learning groups including a subset that is included in the plurality of learning groups in common.

6. A machine learning method performed by a computer and comprising:

storing, in a storage apparatus a training data set, which is a plurality of pieces of training data, where each of the pieces of training data is a pair of data and a label:

dividing the training data set into a plurality of subsets, wherein a number of the plurality of data sets is a predetermined number, the plurality of data sets each have data that does not overlap the data of any other of the plurality of data sets, and the training data set is divided into the plurality of subsets such that a number of the pieces of the training data in each subset is even;

generating, from the training data set, a plurality of learning groups having data at least respective parts of which are different from each other, wherein the plurality of learning groups includes an entire training data group including all data in the training data set, and wherein the plurality of learning groups is generated such that each of the plurality of subsets into which the training data set has been divided belongs to at least one of the plurality of learning groups;

learning a predetermined data determination model for each of the plurality of learning groups;

storing a plurality of learned models that correspond to the respective learning groups, including storing the learned model generated by learning the predetermined data determination model using the entire training data group as training data, as an operation model;

inputting, to each of the plurality of learned models, determination target data that is not included in the corresponding learning group, wherein the determination target data is input operation data that is externally acquired;

acquiring a number of first determination results corresponding to a number of the learned models; and specifying a first inappropriate data group in which the label has a possibility of being inappropriate from the training data set based on the first determination results and a correct answer label in the determination target data, wherein the method further comprises:

comparing each of the first determination results with the correct answer label, specifying a first learning group set of the plurality of learning groups that correspond to the learned model in which a comparison result indicates a coincidence and second learning group set of the plurality of learning groups that correspond to the learned model in which the result of the comparison does not show a coincidence, wherein the first inappropriate data group is specified from the difference between the first learning group set and the second learning group set, the first inappropriate data group is specified such that the number of the pieces of the training data in each subset is even, and the first inappropriate data group is specified as one of the plurality of subsets:

inputting the first inappropriate data group to at least one learned model that corresponds to the first learning group set, thereby acquiring a second determination result; and specifying one or more pieces of data of the first inappropriate data group in which the second determination result does not coincide with the label as a second inappropriate data group, wherein the predetermined data determination model is learned using a set obtained by excluding the second inappropriate data group from the training data set as the training data, and a new learned model is then stored, in learning the data determination model, parameters of the data determination model are learned after removal of training data to which an incorrect label is attached, such that the training data that is selected is reduced.

7. A non-transitory computer readable medium storing a machine learning program executable by a computer to perform processing comprising:

storing, in a storage apparatus a training data set, which is a plurality of pieces of training data, where each of the pieces of training data is a pair of data and a label;

dividing the training data set into a plurality of subsets, wherein a number of the plurality of data sets is a predetermined number, the plurality of data sets each have data that does not overlap the data of any other of the plurality of data sets, and the training data set is divided into the plurality of subsets such that a number of the pieces of the training data in each subset is even;

generating, from the training data set, a plurality of learning groups having data at least respective parts of which are different from each other, wherein the plurality of learning groups includes an entire training data group including all data in the training data set, and wherein the plurality of learning groups is generated such that each of the plurality of subsets into which the training data set has been divided belongs to at least one of the plurality of learning groups;

learning a predetermined data determination model for each of the plurality of learning groups;

storing a plurality of learned models that correspond to the respective learning groups, including storing the learned model generated by learning the predetermined data determination model using the entire training data group as training data, as an operation model;

inputting, to each of the plurality of learned models, determination target data that is not included in the corresponding learning group, wherein the determination target data is input operation data that is externally acquired;

acquiring a number of first determination results corresponding to a number of the learned models; and specifying a first inappropriate data group in which the label has a possibility of being inappropriate from the training data set based on the first determination results and a correct answer label in the determination target data, wherein the method further comprises:

comparing each of the first determination results with the correct answer label, specifying a first learning group set of the plurality of learning groups that correspond to the learned model in which a comparison result indicates a coincidence and second learning group set of the plurality of learning groups that correspond to the learned model in which the result of the comparison does not show a coincidence, wherein the first inappropriate data group is specified from the difference between the first learning group set and the second learning group set, the first inappropriate data group is specified such that the number of the pieces of the training data in each subset is even, and the first inappropriate data group is specified as one of the plurality of subsets;

inputting the first inappropriate data group to at least one learned model that corresponds to the first learning group set, thereby acquiring a second determination result; and specifying one or more pieces of data of the first inappropriate data group in which the second determination result does not coincide with the label as a second inappropriate data group, wherein the predetermined data determination model is learned using a set obtained by excluding the second inappropriate data group from the training data set as the training data, and a new learned model is then stored, in learning the data determination model, parameters of the data determination model are learned after removal of training data to which an incorrect label is attached, such that the training data that is selected is reduced.

* * * * *